(12) United States Patent
Chen

(10) Patent No.: US 11,019,389 B2
(45) Date of Patent: May 25, 2021

(54) DETERMINATION OF ENHANCED VIEWING EXPERIENCES BASED ON VIEWER ENGAGEMENT

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/830,371

(22) Filed: Dec. 4, 2017

(65) Prior Publication Data

US 2019/0174170 A1    Jun. 6, 2019

(51) Int. Cl.
| | |
|---|---|
| *G09G 5/00* | (2006.01) |
| *H04N 21/431* | (2011.01) |
| *G06F 3/01* | (2006.01) |
| *G06F 3/0346* | (2013.01) |
| *G02B 27/01* | (2006.01) |
| *G06T 19/00* | (2011.01) |
| *H04N 21/81* | (2011.01) |
| *H04N 21/45* | (2011.01) |
| *H04N 21/44* | (2011.01) |
| *H04N 21/422* | (2011.01) |

(52) U.S. Cl.
CPC ..... *H04N 21/4316* (2013.01); *G02B 27/0172* (2013.01); *G06F 3/012* (2013.01); *G06F 3/013* (2013.01); *G06F 3/0346* (2013.01); *G06T 19/006* (2013.01); *H04N 21/42222* (2013.01); *H04N 21/44016* (2013.01); *H04N 21/4524* (2013.01); *H04N 21/4532* (2013.01); *H04N 21/812* (2013.01); *H04N 21/816* (2013.01); *G02B 2027/014* (2013.01); *G02B 2027/0134* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 7,901,288 B2 | 3/2011 | Barsness et al. | |
| 9,414,114 B2 | 8/2016 | Ariantaj et al. | |
| 2002/0104090 A1 | 8/2002 | Stettner | |
| 2003/0006911 A1 | 1/2003 | Smith et al. | |
| 2006/0036493 A1 | 2/2006 | Aufricht et al. | |
| 2006/0121427 A1* | 6/2006 | Skoglund | G09B 7/06 434/236 |
| 2007/0300280 A1 | 12/2007 | Turner et al. | |
| 2009/0076894 A1 | 3/2009 | Bates et al. | |

(Continued)

OTHER PUBLICATIONS

YIP, Aaron, Quora, "How Do Augmented Reality Displays Work?," Article, Jan 9, 2017, pp. 1-6, Forbes, https://www.forbes.com/sites/quora/2017/01/09/how-do-augmented-reality-displays-work/#44bd930e4731 <https://www.forbes.com/sites/quora/2017/01/09/how-do-augmented-reality-displays-work/>.

(Continued)

*Primary Examiner* — Kirk W Hermann
(74) *Attorney, Agent, or Firm* — Banner & Witcoff, Ltd.

(57) ABSTRACT

An enhanced viewing device may move with a user as the user moves around the room. An amount of movement associated with the enhanced viewing device may be determined. Based on the amount of movement, an enhanced viewing experience may be determined and displayed to the user.

24 Claims, 20 Drawing Sheets

(56) References Cited

U.S. PATENT DOCUMENTS

| | | | |
|---|---|---|---|
| 2009/0298650 A1* | 12/2009 | Kutliroff | A63B 24/0087 482/8 |
| 2010/0268684 A1 | 10/2010 | Friedlander et al. | |
| 2011/0213664 A1 | 9/2011 | Osterhout et al. | |
| 2012/0200601 A1 | 8/2012 | Osterhout et al. | |
| 2013/0095924 A1* | 4/2013 | Geisner | G06F 3/012 463/32 |
| 2013/0197680 A1* | 8/2013 | Cobbett | G06F 19/3481 700/91 |
| 2014/0163927 A1* | 6/2014 | Molettiere | A61B 5/681 702/189 |
| 2014/0278139 A1* | 9/2014 | Hong | A61B 5/681 702/19 |
| 2016/0217616 A1* | 7/2016 | Kraver | G06F 3/012 |
| 2017/0336863 A1* | 11/2017 | Tilton | G06F 3/012 |
| 2018/0005443 A1* | 1/2018 | Poulos | G06F 3/017 |
| 2018/0024623 A1* | 1/2018 | Faaborg | G06F 3/011 345/156 |
| 2018/0136744 A1* | 5/2018 | Karlsson | G06F 3/011 |
| 2018/0299955 A1* | 10/2018 | Chen | G06F 3/015 |
| 2018/0307397 A1* | 10/2018 | Hastings | G06F 3/04815 |
| 2018/0365898 A1* | 12/2018 | Costa | G06F 3/011 |
| 2019/0102047 A1* | 4/2019 | Anderson | G06F 3/0481 |
| 2019/0175989 A1* | 6/2019 | Yi | A63B 24/0075 |

OTHER PUBLICATIONS

Charara, Sophie, "How does VR actually work?" Article, Dec. 26, 2017, Wareable, <https://www.wareable.com/vr/how-does-vr-work-explained>.

Wikipedia Contributors, "Virtual Reality Headset," Wikipedia, Created Mar. 1, 2016, https://en.wikipedia.org/wiki/Virtual_reality_headset>.

Wikipedia Contributors, "Stereoscopy", Wikipedia, Created Mar. 26, 2003, https://en.wikipedia.org/wiki/Stereoscopy>.

Wikipedia Contributors, "Gyroscope", Wikipedia, Created Mar. 13, 2002 <https://en.wikipedia.org/wiki/Gyroscope>.

Wikipedia Contributors, "Vibrating structure gyroscope," Wikipedia, Created Sep. 3, 2004, https://en.wikipedia.org/wiki/Vibrating_structure_gyroscope#MEMS_gyroscopes <https://en.wikipedia.org/wiki/Vibrating_structure_gyroscope>.

Wikipedia Contributors, "Eye Tracking," Wikipedia, Created Feb. 25, 2005<https://en.wikipedia.org/wiki/Eye_tracking>.

Wikipedia Contributors, "Structured Light," Wikipedia, Created Aug. 16, 2006, https://en.wikipedia.org/wiki/Structured_light>.

Wikipedia Contributors, "Game Controller," Wikipedia, Created Oct. 14, 2002, ps://en.wikipedia.org/wiki/Game_controller>.

Wikipedia Contributors, "Latency (engineering)", Wikipedia, Created Jul. 30, 2001,<https://en.wikipedia.org/wiki/Latency_%28engineering%29>.

* cited by examiner

Interactive Advertisement Index

| Advertisement | Movement Threshold Score |
|---|---|
| Boxing advertisement | 8/10 |
| Soccer advertisement | 10/10 |
| Card game advertisement | 2/10 |

Figure 6

DETERMINATION OF ENHANCED VIEWING EXPERIENCES BASED ON VIEWER ENGAGEMENT

BACKGROUND

Virtual-reality systems today may provide viewers with content that they can watch (e.g., movies, video games). Providers of such content may seek more ways to draw in viewers and the keep the viewers' attention and interest. Content providers may try to attract and retain more viewers by providing enhanced viewing experiences, such as with interactive features in their content (e.g., requiring users to provide feedback, answer a quiz, etc.). However, these experiences require resources and bandwidth.

SUMMARY

People may use enhanced viewing devices, such as a virtual reality headset or augmented reality glasses, to view video content, and in some instances to engage in enhanced viewing experiences for that video content. The enhanced viewing experiences may contain, for example, an advertisement that may prompt a user to move around the room to interact with the advertisement. By using historical data, a user's location, and user preferences associated with a user's movement to determine which interactive advertisement to display to the user, an enhanced viewing device may more efficiently determine whether it should bother with processing and offering the enhanced viewing experience.

The enhanced viewing device may determine an amount of movement that each of a plurality of interactive advertisements may prompt a user for. This may comprise a movement threshold score. The enhanced viewing device may determine, based on determined movement data associated with the user's movements, a user's preferred level of activity for interactive advertisements. This may comprise a movement value for the user. The enhanced viewing device may select or determine, for display, an enhanced viewing experience based on a correlation between the movement threshold score and the movement value.

The enhanced viewing device may also determine, based on user input and determined movement data associated with the user, a boundary. The enhanced viewing device may select, for display, an enhanced viewing experience that prompts for interaction within the boundary based on the user's location within the boundary and an orientation of the user at the location (standing a foot to the right of a wall and facing the wall).

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

FIG. 6 shows an example of an interactive advertisement index comprising correlations between interactive advertisements and an amount of movement prompted for by each of the interactive advertisements.

DETAILED DESCRIPTION

In the following description of examples, reference is made to the accompanying drawings, which form a part hereof. It is to be understood that other examples may be utilized and structural or functional modifications may be made, without departing from the scope of the present disclosure.

Figure 1:
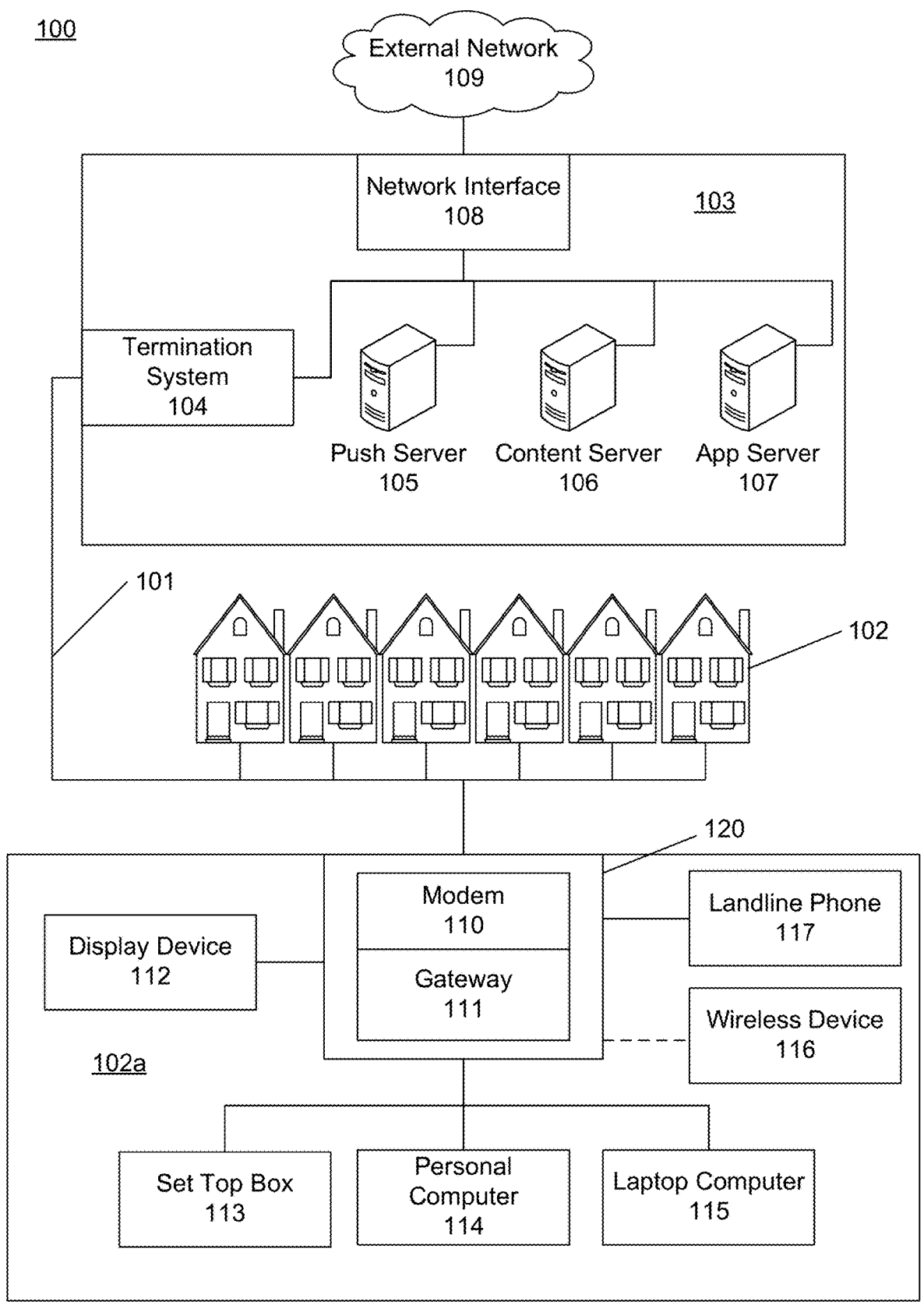
FIG. 1 shows an example communication network.

FIG. 1 shows an example communication network 100 on which one or more of the features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-07. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, and/or any other desired network. The network interface 108 may include the corresponding circuitry needed to communicate on the external networks 109, and to other devices on the network such as a cellular telephone network and its corresponding cell phones.

The local office 103 may include a variety of servers 105-07 that may be configured to perform various functions. A push notification server 105 may generate push notifications to deliver data or commands to the various premises 102 in the network or to the devices in the premises 102 that are configured to detect such notifications. Content servers 106 may be one or more computing devices that are configured to provide content to users at their premises. This content may be, for example, video content such as video on demand movies or television programs, songs, text listings, or other types of content. A content server 106 may include software to validate user identities and entitlements, to locate, retrieve, and receive requested content, to encrypt the content, and to initiate delivery by streaming of the content to the requesting user or device. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. An application server 107 may be responsible for collecting television program listings information and generating a data download for electronic program guide listings. The application server 107 may be responsible for monitoring user viewing habits and collecting that information for use in selecting and determining advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, the content server 106, and the application server 107 are shown generally, and it will be understood that they may each contain memory storing computer executable instructions to cause a processor to perform steps described herein or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices, such as an enhanced viewing device, in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, enhanced viewing devices, wireless devices 116 such as wireless routers, wireless laptops, notebooks, tablets, netbooks, or smart phones, cordless phones, for example, Digital Enhanced Cordless Telephone-DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Figure 2:
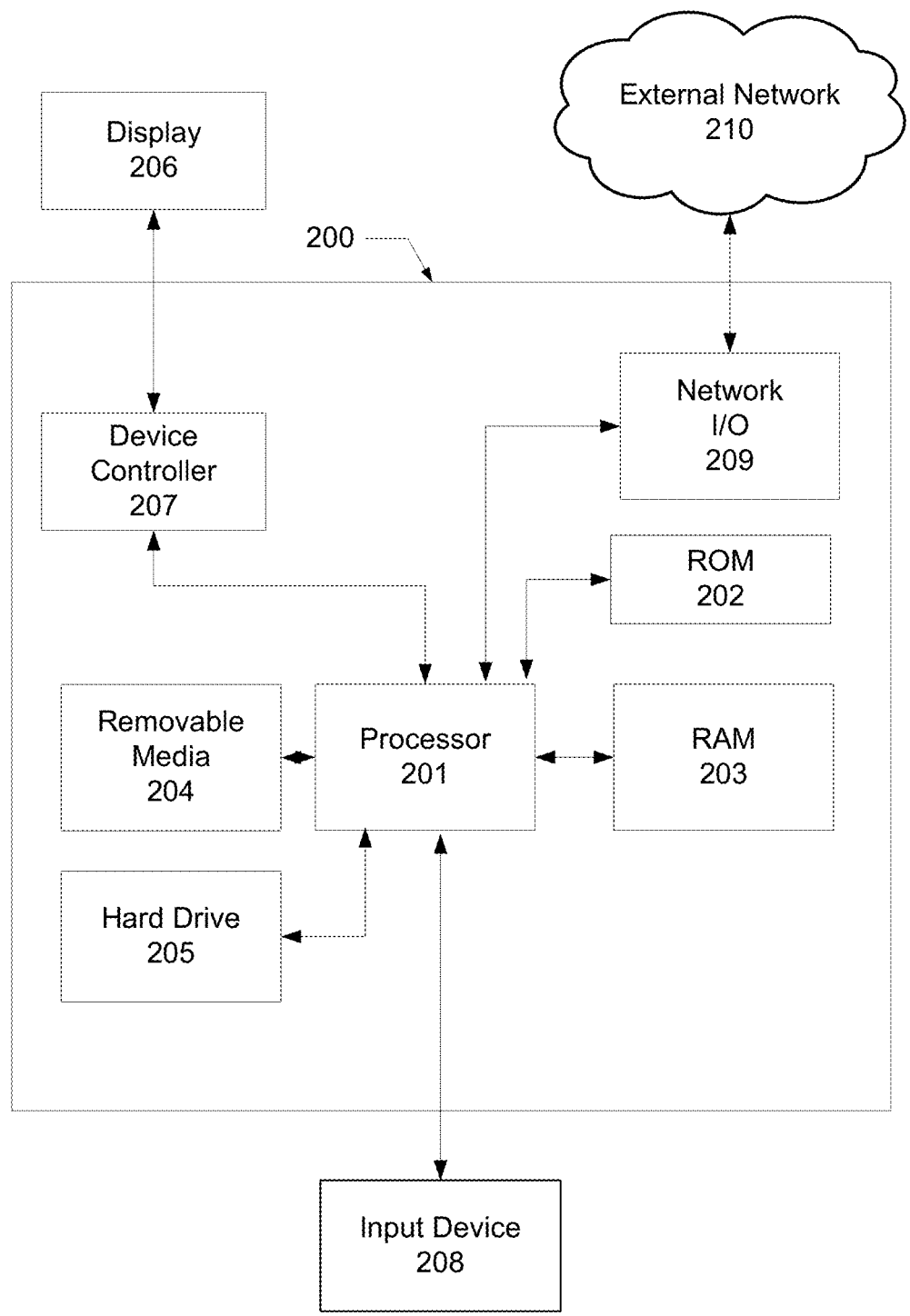
FIG. 2 shows an example computing device.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software.

Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices, so that, when executed, the instructions cause the computing devices described herein to perform the various steps and algorithms described. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Data structures are contemplated within the scope of computer executable instructions and computer-usable data described herein.

Although examples are described herein, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. The description herein is by way of example only, and not limiting.

The device 200 may comprise an enhanced viewing device that may be used to implement any of the methods described herein. The enhanced viewing device may comprise one of: a virtual reality (VR) headset or augmented reality (AR) glasses. For example, the enhanced viewing device may comprise a Six Degrees of Freedom (DOF) VR headset such as an OCULUS RIFT™ or HTC VIVE™. The enhanced viewing device may comprise a Three DOF headset such as a GEAR VR™ or a DAYDREAM™. The VR headset may present an immersive virtual experience to a user. The AR glasses may allow the user to view real world elements, wherein at least a portion of the real world elements are augmented by computer generated sensory input such as sound, video, graphic, or additional data. The enhanced viewing device may comprise a stereoscopic head mounted display. This may allow the enhanced viewing device to provide a separate image for each eye. The stereoscopic head mounted display may provide two offset two dimensional images separately to the left eye of a user and the right eye of the user. The user's brain may combine the two offset two dimensional images to create a perception of three dimensional depth. For example, the user may be engaged in a first-person shooter enhanced viewing experience, and multiple images may be provided to each of the user's eyes to create the illusion that the user is immersed in a firefight.

The enhanced viewing device may also produce stereo sound. The enhanced viewing device may comprise speakers and/or headphones. This may create an illusion, for the user, of being immersed in an enhanced viewing experience. For example, the user may hear sounds as if they are coming from all around him/her. For example, the user may hear gunshots, explosions, enemy commands, and friendly commands as if the user is surrounded by these sounds.

The enhanced viewing device may also comprise head motion tracking sensors such as, for example, gyroscopes, accelerometers, structured light systems, and the like. Each gyroscope may comprise an electronic, microchip-packaged microelectromechanical systems (MEMS) gyroscope. The microchip-packaged MEMS gyroscope may use lithographically constructed versions of one or more or tuning forks, vibrating wheels, or resonant solids of various designs, to provide an analog output or a digital output. Thus, the enhanced viewing device may use a plurality of analog/digital outputs to determine and/or to maintain orientation. Each accelerometer may be used to measure acceleration of the enhanced viewing device. The enhanced viewing device may use the accelerometers to maintain user interface control, such as controlling the orientation of an enhanced viewing experience displayed on the enhanced viewing device. The enhanced viewing device may use the structured light systems to determine a depth of objects displayed in an enhanced viewing experience and additional surface information associated with the objects displayed in the enhanced viewing experience. For example, as part of the enhanced viewing experience, the user may be perched on top of a building as a sniper during the firefight. The user may turn his/her head while looking through the scope of a rifle, and the scene displayed to the user may turn to correspond with the user's head movements.

The enhanced viewing device may also comprise eye tracking sensors. The eye tracking sensors may measure a point of gaze and/or motion of the user's eye relative to the user's head. The eye tracking sensors may extract the user's eye position from video images. For example, in addition to adjusting the scene displayed to the user through the scope of the rifle, the enhanced viewing experience may rotate/adjust the scene to correspond to the user's eye movements as he/she is looking around.

The enhanced viewing device, or a computing device managing the viewing device, may receive input from one or more gaming controllers. The user may provide input to an enhanced viewing experience via the gaming controllers. The gaming controllers may comprise a wireless controller, such as a keyboard, a mouse, a gamepad, a joystick, a steering wheel, a musical instrument, and/or a light gun.

The enhanced viewing device may use a smartphone as a display. The user may insert a smartphone into the enhanced viewing device, and then may engage in an enhanced viewing experience on the screen of the smartphone through lenses comprising the enhanced viewing device. The lenses may comprise stereoscopic lenses.

Figure 3:
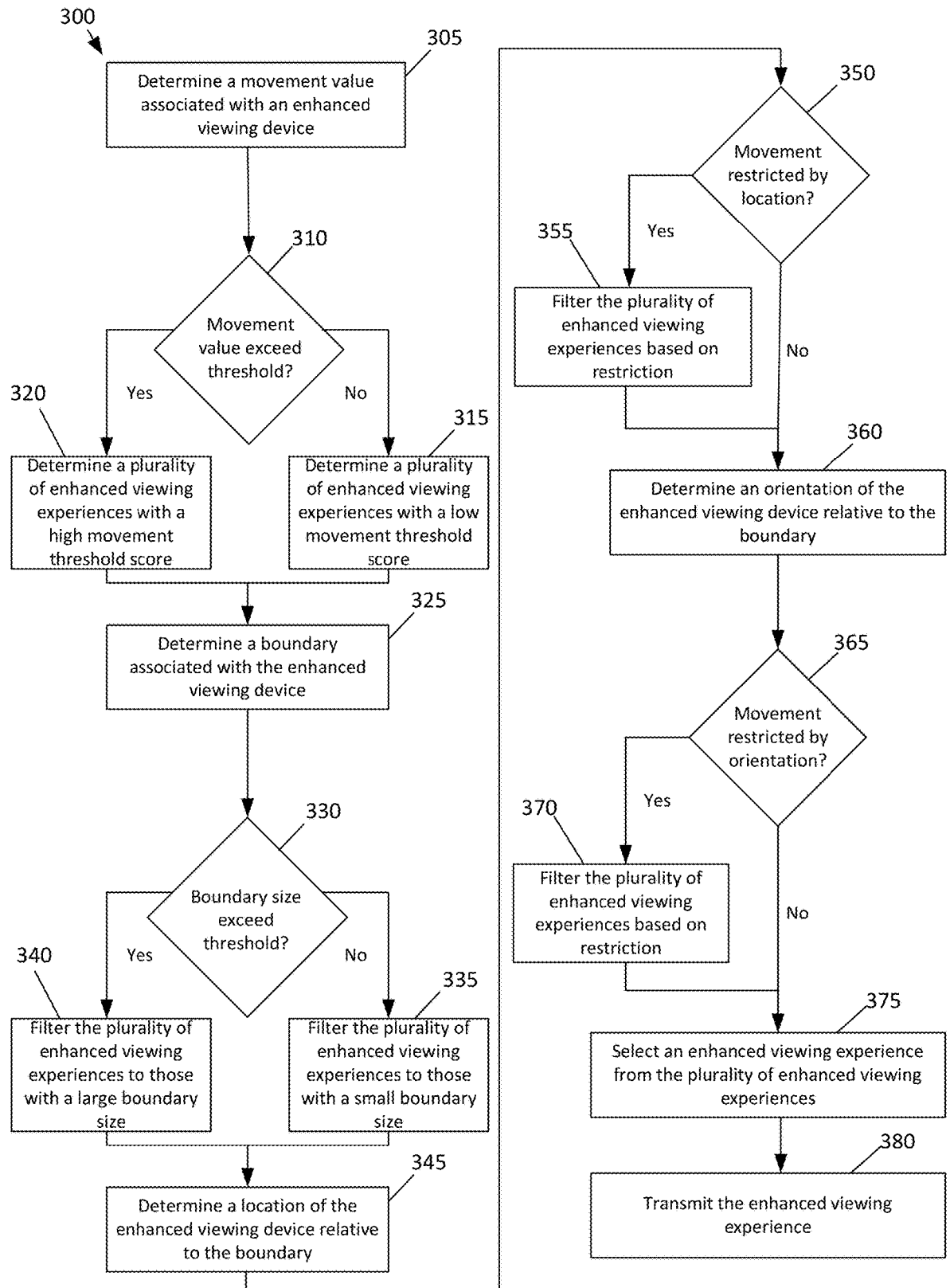
FIG. 3 is a flow diagram of a method for determining an enhanced viewing experience based on movement data associated with a user.

FIG. 3 is a flow diagram of a method 300 for determining an enhanced viewing experience based on movement data associated with a user. For example, a user may be engaged in a virtual reality experience, and the virtual reality experience may prompt the user to enter an interactive advertisement. The enhanced viewing experience may prompt the user to run, walk, jump, wave an arm, and the like. An enhanced viewing experience such as playing a virtual soccer game may be assigned a high movement threshold score (indicating that the game may prompt the user for significant movements), as the game may prompt a user to run around the room, dive, and kick the soccer ball. An enhanced viewing experience such as playing a virtual card game may be assigned a low movement threshold score (indicating that the game may prompt the user for minimal movements), as the game may prompt a user to sit and place playing cards on a virtual table. In one or more examples, one or more steps may be performed by one or more computing devices or entities. For example, some or all of the steps may be performed by components of the network 100 or the computing device 200. Some or all of the steps may be embodied in computer-executable instructions that are stored in a computer-readable medium, such as a non-transitory computer readable medium. Such instructions, when executed by one or more processors, may cause a computing device to perform some or all of the steps. The steps in this flow diagram need not all be performed in the order specified and some steps may be omitted or changed in order.

At step 305, the enhanced viewing device, such as the enhanced viewing device, may determine a movement value. The movement value may comprise a measure of a user's current level of movement. For example, if the user is watching a movie, and has already stood up to interact with a prior advertisement, then the user's current movement value may be higher than, for example, if the user is passively sitting on a couch while watching the movie. As will be discussed below, this movement value may be used to determine a degree of enhancement or interactivity to apply to, for example, an upcoming advertisement. A computing device, such as the enhanced viewing device, may assess how active a user is in interactive games or interactive viewing experiences. The enhanced viewing device may assess how active a user is based on data indicating previous movements of the user during an enhanced viewing experience. The enhanced viewing device, or an associated computing device, may track the magnitude and/or direction of movements associated with the enhanced viewing device and any associated input affordances. The tracked magnitude and/or direction of movements may be used to determine the movement value, or an activity level. The computing device may take into account the user's general level of fitness and/or general level of mobility. For example, the system may retrieve a user profile storing information identifying the user's general level of fitness. This information may comprise information such as an average heart rate, a quantity of steps per day, a user's weight, a quantity of workouts per week, a physical disability, a temporary injury, and the like. Thus, the movement value may indicate the types of movement and/or degree of movement that the user can or cannot make.

The enhanced viewing device may assess how active a user is based on a queue of previously-selected enhanced viewing experiences. For example, the enhanced viewing device may determine, based on a stored queue, that the user's last five enhanced viewing experiences comprise playing a soccer game, playing a tennis match, playing a first person shooter game, playing a baseball game, and playing a round of golf. These may comprise enhanced viewing experiences associated with a high level of activity (e.g., running, kicking, swinging a racquet/club, shooting a gun, pitching, etc.). Thus, the enhanced viewing device may determine that, based on the queue of previously selected enhanced viewing experiences, the user is fairly active.

The enhanced viewing device may determine the movement value based on a detection that the user is sitting down. For example, the enhanced viewing device may determine that, based on a height of the enhanced viewing device, the user is in a sitting position. If the user is sitting, the enhanced viewing device may be associated with a low movement value, whereas if the user is standing, the enhanced viewing device may be associated with a high movement value. In some example, although the user may currently be sitting, the enhanced viewing device may determine that, during a majority of previous enhanced viewing experiences, the user has been standing. Thus, although the user is sitting, he or she may be associated with a high movement value and may receive an enhanced viewing experience prompting for standing interaction even though he or she is currently sitting down.

The enhanced viewing device may determine the movement value based on a detection that the user is rotating his or her head. The movement value may comprise an aggregate of multiple amounts of movement such as right arm movement, left arm movement, jumping, head turning, standing, sitting, and the like. The enhanced viewing device may determine the movement value based on a determination that the user is engaging or has engaged in movements via one or more input devices, such as hand controllers. The enhanced viewing device may determine the movement value using an accelerometer in the enhanced viewing device or in communication with the enhanced viewing device. For example, the enhanced viewing device may determine that a user engaged in a plurality of enhanced viewing experiences that prompted for a change in viewpoint, but not in location. Although the enhanced viewing device may detect motion, that motion may merely be sitting and turning in a swivel chair. The enhanced viewing device may be more interested in catching a user's eye than in prompting him or her for significant movement. The enhanced viewing device may transmit to a server, such as an advertisement server, the movement value. The advertisement server may comprise a content server such as the content server 106.

An enhanced viewing device comprising a headset and a pair of hand controllers may determine that the pair of hand controllers is experiencing a higher level of motion than the headset. For example, a user may be sitting on the couch, and thus may not be moving the headset very much, but may be throwing punches with the hand controllers while playing a boxing game. As a result, the enhanced viewing device may determine that although a headset comprising the enhanced viewing device is associated with a low movement value, a pair of hand controllers comprising the enhanced viewing device is associated with a high movement value.

The enhanced viewing device may determine how quickly a user is moving around a room. For example, although the user is moving a large distance, he or she may be moving slowly. This may cause the enhanced viewing device to be associated with a low movement value. If the user is moving around the room quickly the enhanced viewing device may be associated with a high movement value. The enhanced viewing device may make these determinations using one or more of: motion sensors, accelerometers, GPS tracking devices, and cameras. The enhanced viewing device may maintain a data table indicating movement values that correspond to velocity, speed, and/or distance traveled of the enhanced viewing device. For example, a speed of six miles per hour (mph) may correlate to a movement value of 90/100 (a high movement value). A speed of one mile per hour may correlate to, for example, a movement value of 10/100 (a low movement value).

The enhanced viewing device may also determine the movement value based on preset or dynamically updated user preferences, and may disregard the actual current level of user activity. For example, the user may provide input, to the enhanced viewing device, indicating that he/she prefers enhanced viewing experiences that prompt for significant movement. In such an example, even if the user is currently just sitting on the couch and not moving much at all, the system may recognize the user's preference for higher degrees of activity, and may use that information to determine what types of interactive content to provide to the user.

The movement value may be determined, but is not limited to determination, based on any or all of the factors described above.

At step 310, the enhanced viewing device may determine how the movement value compares to a threshold movement value. For example, the threshold movement value may comprise a predetermined threshold. The enhanced viewing device may use this comparison to choose between high interactivity enhanced viewing experiences and low interactivity enhanced viewing experiences to deliver to the user. For example, some experiences may prompt the user to stand up and jump (high interactivity), whereas other experiences may prompt the user to merely raise his or her hand (low interactivity). For example, the user may be engaged in a virtual reality experience, and the enhanced viewing device may determine a plurality of enhanced viewing experiences to integrate into the virtual reality experience. Each of the plurality of enhanced viewing experiences may prompt the user for a different amount of motion such as sitting, walking, and the like. The enhanced viewing device may determine the plurality of enhanced viewing experiences based on factors such as, but not limited to, a user's geographic location, a user's viewing history, or preset settings input by a user. The enhanced viewing experiences may comprise interactive advertisements, or any other interactive content. The enhanced viewing experiences may comprise virtually reconstructed video replay content. Examples of enhanced viewing experiences are further described below with regards to FIGS. 10-17 and 19-22. The plurality of enhanced viewing experiences may also be determined by a server associated with the enhanced viewing device, such as the advertising server.

The enhanced viewing device may determine the threshold movement value via machine learning algorithms. For example, the enhanced viewing device may aggregate movement data from various users who engage in enhanced viewing experiences via the enhanced viewing device, and may compare the movement data from the user to the movement data from various users. The enhanced viewing device may also receive movement data, associated with various users, from additional enhanced viewing devices and/or a server associated with the additional enhanced viewing devices. As such, the enhanced viewing device may be capable of comparing the movement data from the user with movement data of various other users who may be engaging in enhanced viewing experiences via the additional enhanced viewing devices. The threshold movement value may be an aggregate of different movement values. For example, the threshold movement value may aggregate movement values of a pair of hand controllers and a headset. For example, an enhanced viewing experience may prompt for motion via the pair of hand controllers and the headset. The enhanced viewing device may take into account an average speed of the pair of hand controllers and the average speed of the enhanced viewing device when determining the threshold movement value. If the movement value does exceed the threshold movement value, the enhanced viewing device may proceed to step 320 and may determine a plurality of enhanced viewing experiences associated with a high movement threshold score. If the movement value does not exceed the threshold movement value, the enhanced viewing device may proceed to step 315 and may determine a plurality of enhanced viewing experiences associated with a low movement threshold score.

At step 315, the enhanced viewing device may determine a plurality of enhanced viewing experiences associated with a low movement threshold score. The enhanced viewing device may correlate the enhanced viewing experiences to low movement threshold scores. The enhanced viewing device may assign a movement threshold score to each of the enhanced viewing experiences based on a movement value prompted for by the enhanced viewing experiences. For example, the enhanced viewing device may assign a low movement threshold score to an enhanced viewing experience such as playing a virtual card game, as the game may prompt a user to sit and place playing cards on a virtual table. The enhanced viewing device may store the plurality of enhanced viewing experiences and their associated movement threshold scores in an enhanced viewing experience index, such as the interactive advertisement index 610 described below. The enhanced viewing device may display, to the user, the enhanced viewing experience index, and the user may select an interactive viewing experience based, at least in part, on the movement threshold score associated with the interactive viewing experience. The enhanced viewing device may automatically serve an enhanced viewing experience, via a display comprising the enhanced viewing device, to the user based on that user's movements. For example, the enhanced viewing device may select a static movie trailer as opposed to an interactive movie trailer. There may also be different versions of the interactive movie trailer available which show scenes from the perspective of different characters in the movie. The enhanced viewing device may select a version of the interactive movie trailer in which the user may view the interactive movie trailer from the perspective of a stationary sidekick of an action hero. This version of the interactive movie trailer might not prompt the user for strenuous activity.

At step 320, the enhanced viewing device may determine a plurality of enhanced viewing experiences associated with a high movement threshold score. The enhanced viewing device may correlate the enhanced viewing experiences to high movement threshold scores. The enhanced viewing device may assign a movement threshold score to each of the enhanced viewing experiences based on a movement value prompted for by the enhanced viewing experiences. For example, the enhanced viewing device may assign a high movement threshold score to an enhanced viewing experience such as playing a virtual soccer game, as the game may prompt a user to run around the room, dive, and kick the soccer ball. The enhanced viewing device may store the plurality of enhanced viewing experiences and their associated movement threshold scores in an enhanced viewing experience index, such as the interactive advertisement index 610 described below. The enhanced viewing device may display, to the user, the enhanced viewing experience index, and the user may select an interactive viewing experience based, at least in part, on the movement threshold score associated with the interactive viewing experience. The enhanced viewing device may automatically serve an enhanced viewing experience, via a display comprising the enhanced viewing device, to the user based on that user's movements. For example, the enhanced viewing device may select an interactive movie trailer as opposed to a static movie trailer. There may also be different versions of the interactive movie trailer available which show scenes from the perspective of different characters in the movie. The enhanced viewing device may select a version of the interactive movie trailer in which the user may view the interactive movie trailer from the perspective of an action hero from the movie. This version of the interactive movie trailer may prompt the user for significant movement.

Figure 4:
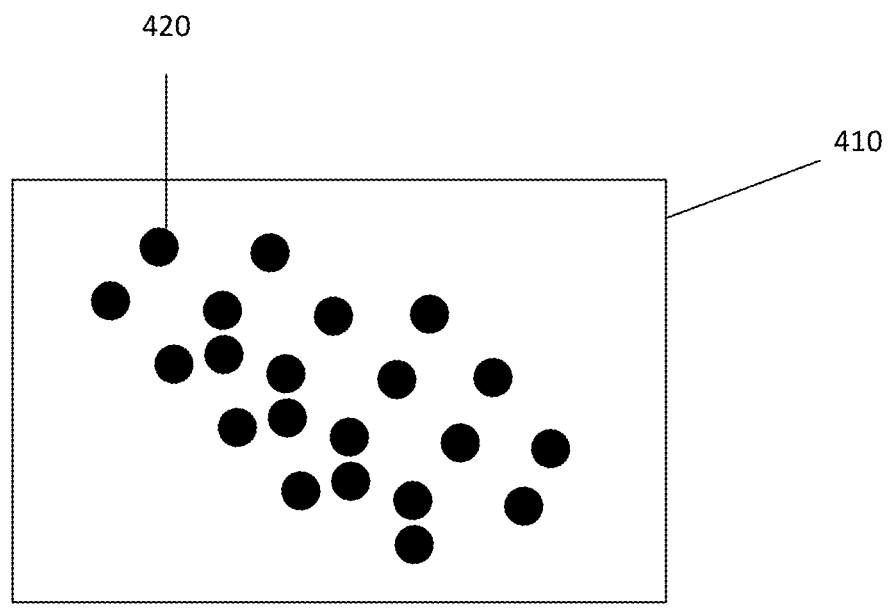
FIG. 4 shows an example boundary that defines user input parameters of a virtual reality engagement area.

At step 325, the enhanced viewing device may determine a boundary associated with the enhanced viewing device. The boundary may dictate a degree of freedom for a user's interaction with an enhanced viewing experience, such as the interactive movie trailer described above at steps 315 and 320. For example, if the user is engaged in the virtual reality experience in a gymnasium, he or she may have a more widespread range of motion than if the user is engaged in the virtual reality experience in a small bedroom. As a result, the enhanced viewing device may determine a more expansive boundary in the gymnasium than in the small bedroom. The boundary may comprise a plurality of spatial constraints on a user's movements during an enhanced viewing experience. The enhanced viewing device may determine, based on the user's current movements, the boundary. For example, these may be movements occurring within a time period prior to determining the boundary. The time period may be a predetermined time period. The enhanced viewing device may determine, based on historical data associated with the user's movements, the boundary. The enhanced viewing device may determine, based on the historical data, a plurality of positions where the user typically engages in enhanced viewing experiences. The historical data may comprise information associated with the user's location and information associated with the user's orientation. Based on the historical data, the enhanced viewing device may create a boundary, wherein the plurality of positions where the user typically engages in enhanced viewing experiences fall within the boundary, and an area where the user does not typically engage in enhanced viewing experiences falls outside the boundary. An example of this concept is shown at FIG. 4.

The enhanced viewing device may transmit, to a server associated with the enhanced viewing device, the historical data. The server may determine, based on the historical data, the boundary.

The enhanced viewing device may determine the boundary based on a room scale configuration input from the user. The user may provide, to the enhanced viewing device, the room scale configuration input. For example, the enhanced viewing device may prompt the user to walk around an exterior boundary to define the boundary. The user may walk in a circle within a certain room, and the enhanced viewing device may determine that the circle comprises the boundary. The enhanced viewing device may send, to a server, associated with the enhanced viewing device, the boundary.

The enhanced viewing device may prompt the user to input, into the enhanced viewing device, an available range of view. For example, a user in a large open space may have a wide range of view, which may allow the user to swing his or her arms around and perform a full head rotation, whereas a user sitting on an airplane may have a narrow range of view, and may be restricted to small wrist movements and limited head rotation. The enhanced viewing device may determine, based on the available range of view, the boundary. The enhanced viewing device may transmit, to the server, the boundary.

Figure 5:
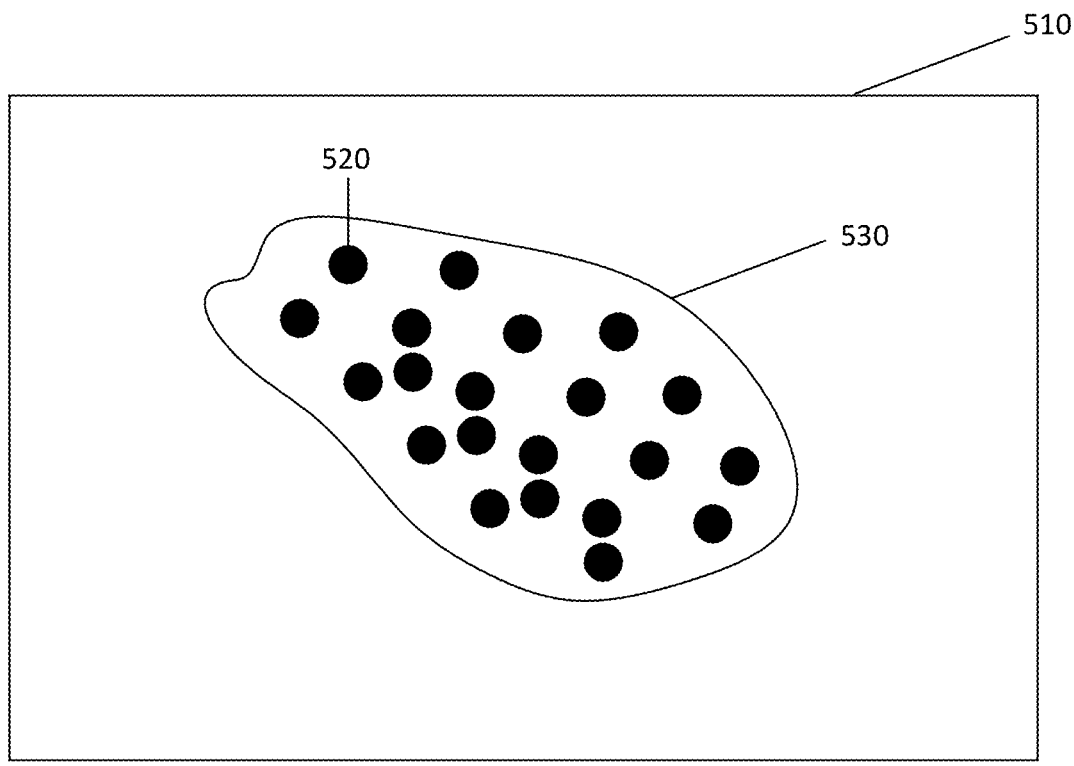
FIG. 5 shows an example boundary, within a user defined boundary, defining a synthesized virtual reality engagement area that may be based on user input parameters and additional data.

The enhanced viewing device may prompt the user to input, via an input device associated with the enhanced viewing device such as a hand controller, dimensions of the boundary. For example, the user may input that he/she can move three meters in each direction. The enhanced viewing device may adjust the boundary, determined via the room scale configuration input from the user, based on historical data associated with the user's movements. For example, the user may input the dimensions of his or her living room, but the user might not use most of that space while engaging in enhanced viewing experiences. The enhanced viewing device may transmit the boundary to a server associated with the enhanced viewing device, and the server may adjust the boundary based on historical data received from the enhanced viewing device. An example of this concept is shown in FIG. 5.

The enhanced viewing device may determine the boundary based on the placement of a plurality of sensors around a room. The plurality of sensors may communicate, to the enhanced viewing device, a plurality of locations wherein each of the plurality of locations is associated with one of the plurality of sensors. The enhanced viewing device may determine, based on the plurality of locations, the boundary. For example, if the user has sensors set up around his/her living room for engaging in an enhanced viewing experience, the enhanced viewing device may determine the boundary to be within those sensors. The enhanced viewing device may also send, to a server associated with the enhanced viewing device, the plurality of locations. The server may determine, based on the plurality of locations, the boundary.

Actions described at step 325 are further described below with regards to FIGS. 4 and 5.

At step 330, the enhanced viewing device may determine how the boundary compares to a threshold boundary. For example, the threshold boundary may comprise a predetermined threshold boundary. The enhanced viewing device may use this comparison to choose between enhanced viewing experiences prompting for interaction in a large space and enhanced viewing experiences prompting for interaction in a small space to deliver to the user. For example, some experiences may prompt the user to stand in a single location (small space), whereas other experiences may prompt the user to run around a room (large space). The enhanced viewing device may determine the threshold boundary based on an average boundary associated with the enhanced viewing experiences comprising a plurality of enhanced viewing experiences, such as the plurality of enhanced viewing experiences determined at one of steps 315 or 320. For example, the enhanced viewing experiences may each be correlated to a boundary. This boundary may be an expected boundary within which a user may be expected to interact with the enhanced viewing experiences respectively. The enhanced viewing device may store the correlation between the enhanced viewing experiences and the boundary. Thus, the enhanced viewing device may determine the threshold boundary by determining the average boundary of the enhanced viewing experiences.

The enhanced viewing device may also determine the threshold boundary via machine learning algorithms. For example, the enhanced viewing device may determine boundary data associated with other users, determined to be associated with a similar movement value. For example, if two users have similar movement values, they may move around in similar amounts of space when interacting with an enhanced viewing experience. Thus, the enhanced viewing device may use boundary data from other users, who have similar movement values, to determine the threshold boundary. The enhanced viewing device may aggregate boundary data for users with a similar movement value, and may take an average to determine the threshold boundary for a user of that movement value. The enhanced viewing device may receive the boundary data from other users using the enhanced viewing device or from other users using different enhanced viewing devices. The enhanced viewing device may compare the boundary, determined at step 325, with the threshold boundary, described above. This comparison may indicate that the user has more space (a bigger boundary) than a user of a similar movement value or that the user has less space (a smaller boundary) than a user of a similar movement value. If the boundary size does exceed the boundary threshold, the enhanced viewing device may proceed to step 340. If the boundary size does not exceed the boundary threshold, the enhanced viewing device may proceed to step 335.

At step 335, the enhanced viewing device may filter the plurality of enhanced viewing experiences to those associated with a small boundary size (e.g., below the boundary threshold). In doing so, the enhanced viewing device may ensure that the user has enough physical space to interact with the available enhanced viewing experiences. For example, if, in step 330, the system determines that the boundary size is small (e.g., the user is viewing the interactive movie trailer in a small bedroom), then in step 335, the system may select one or more pieces of content (e.g., interactive advertisements) that are suitable for interaction in a small environment. Thus, at step 335, the enhanced viewing device may select the enhanced viewing experiences that are associated with a small boundary size and either a large or small movement threshold score (e.g., above or below the threshold) based on the determination described above at step 310.

At step 340, the enhanced viewing device may filter the plurality of enhanced viewing experiences to those associated with a large boundary size (e.g., above the boundary threshold). In doing so, the enhanced viewing device may allow a user to take advantage of a larger amount of available space. Thus, at step 340, the enhanced viewing device may filter the plurality of enhanced viewing experiences to those associated with a large boundary size and either a large or small movement threshold score (e.g., above or below the threshold) based on the determination described above at step 310.

At step 345, the enhanced viewing device may determine its location. The enhanced viewing device may determine the location relative to the boundary. For example, the location may indicate a distance of the enhanced viewing device from one or more boundaries, or from one or more points on the one or more boundaries. The enhanced viewing device may determine the location based on a magnitude of distance between the enhanced viewing device and the boundary. The enhanced viewing device may determine a magnitude of distance moved from a point of origin, and compare that magnitude with the distance between the point of origin and the boundary to determine the location. The enhanced viewing device may determine the location using a global positioning systems (GPS) device.

A server associated with the enhanced viewing device may determine the location of the enhanced viewing device. The server may determine the location using global positioning system (GPS) tracking of the enhanced viewing device.

At step 350, the enhanced viewing device may determine if the user's movements are restricted by his or her location relative to the boundary. For example, the user may be engaging in a virtual reality experience in a large gymnasium, but may be standing in a corner of the large gymnasium. The enhanced viewing device may determine that, because the user is so close to the boundary, certain movements may cause the user to collide with a wall. Based on this determination, the enhanced viewing device may proceed to step 355. If the enhanced viewing device determines that the user's movements are not restricted by his or her location relative to the boundary (e.g., the user is standing in the center of a large gymnasium), the enhanced viewing device may proceed to step 360.

At step 355, the enhanced viewing device may filter the plurality of enhanced viewing experiences based on the restriction. For example, if the enhanced viewing device determines that the user is standing next to a wall in a gymnasium, the enhanced viewing device may filter the plurality of enhanced viewing experiences to those that may prompt the user for movements away from the wall. As a result, the plurality of advertisements may be filtered to enhanced viewing experiences that are above or below a movement threshold as determined at step 310, associated with a boundary size above or below a boundary threshold as determined at step 330, and that traverse a restriction based on the user's location relative to the boundary as determined at step 350.

At step 360, the enhanced viewing device may determine, using an accelerometer comprising the enhanced viewing device, an orientation of the enhanced viewing device. The accelerometer may indicate which direction the user is facing. The enhanced viewing device may transmit, to a server associated with the enhanced viewing device, the orientation.

At step 365, the enhanced viewing device may determine if the orientation of the enhanced viewing device restricts the movement of the user. For example, the user may be engaged in a virtual reality experience in a gymnasium and may be standing next to a wall while facing the wall. The enhanced viewing device may determine this based on the orientation of the enhanced viewing device. If the enhanced viewing device determines that the movement of the enhanced viewing device is restricted based on the orientation, the enhanced viewing device may proceed to step 370. If the enhanced viewing device determines that the movement of the enhanced viewing device is not restricted based on the orientation, the enhanced viewing device may proceed to step 375.

At step 370, the enhanced viewing device may filter the plurality of enhanced viewing experiences to those that comply with the restriction. For example, if the user is engaged in a virtual reality in a gymnasium and is standing next to a wall, facing the wall, the enhanced viewing device may not select an enhanced viewing experience that prompts the user to move forward because the user may collide with the wall. If the user is engaged in a virtual reality experience in the gymnasium and is standing next to the wall but is facing away from the wall, the enhanced viewing device may filter the plurality of enhanced viewing experiences to those that prompt the user to move forward into open space comprising an interior of the gymnasium. Thus, the plurality of enhanced viewing experiences may be filtered based on movement value, boundary size, location, and orientation at steps 310, 330, 350, and 365 respectively.

At step 375, the enhanced viewing device may select an enhanced viewing experience.

The enhanced viewing experience may comprise an interactive advertisement within a virtual reality experience. The enhanced viewing device may select, from the plurality of enhanced viewing experiences determined at step 360, the enhanced viewing experience. The enhanced viewing device may select the enhanced viewing experience based on an enhanced viewing experience index, which includes a movement threshold score associated with each enhanced viewing experience. An example enhanced viewing experience index is described at FIG. 6. The enhanced viewing experience index may be maintained on the enhanced viewing device. The enhanced viewing device may rank, based on a movement threshold score associated with each of the plurality of enhanced viewing experiences, the enhanced viewing experiences. A high movement threshold score may indicate that an enhanced viewing experience may prompt the user for significant movement. A low movement threshold score may indicate that an enhanced viewing experience may prompt the user for minimal movement.

The enhanced viewing experience index may be transmitted to a server associated with the enhanced viewing device. The enhanced viewing experience index may be maintained at the server. If the enhanced viewing experience index is maintained at the server, the server may determine the enhanced viewing experience.

The enhanced viewing device may select an enhanced viewing experience based on the movement value. If the user has been, or is currently, engaged in a relatively high amount of movement during an enhanced viewing experience, an enhanced viewing experience with a high movement threshold score may be selected. An enhanced viewing experience with the high movement threshold score may comprise a soccer game. The user may walk or run within the boundary to play the soccer game.

If the user has been, or is currently, engaged in a relatively low amount of movement, an enhanced viewing experience with a low movement threshold score may be selected. For example, the enhanced viewing experience may comprise a static experience, such as playing a virtual card game. The virtual card game may prompt the user to merely move his/her hands. The user may be able to sit during the virtual card game, and the enhanced viewing device may not prompt him/her to get up and walk around or to change location.

The enhanced viewing device may select an interactive movie trailer as opposed to a static movie trailer. There may be different versions of the interactive movie trailer available. The different versions may show scenes from the perspective of different characters in the movie, and the enhanced viewing device may select a version of the interactive movie trailer that best matches the character to the user. The enhanced viewing device may make this selection based on the viewer's movement value, so that a more active viewer might see the interactive movie trailer comprising scenes with an action hero of the movie that prompt the user for significant movement. A less active user may view the interactive movie trailer containing scenes with a stationary sidekick of the action hero that prompt the user to carry out less strenuous activity.

If a user is determined to be sitting and frequently engaging in movements with hand controllers, the enhanced viewing device may display an enhanced viewing experience that prompts for hand movements rather than a change in location. For example, the enhanced viewing experience may comprise a game in which user casts spells with a magic wand. The game may be played while the user remains seated.

The enhanced viewing device may deliver enhanced viewing experiences, associated with a high movement threshold score, to entice a user to be more interactive. For example, a user may be engaged in a first enhanced viewing experience, and a floating orb may be placed into the first enhanced viewing experience, prompting the user to enter the orb and to teleport into a second enhanced viewing experience that is more interactive than the first enhanced viewing experience. The enhanced viewing experience may also encourage the user to move to various locations within the room to better facilitate movements and interaction within the enhanced viewing experience.

The enhanced viewing device may display, to the user and via the enhanced viewing device, the enhanced viewing experience index. The user may select, from the enhanced viewing experience index and based, at least in part, on the movement threshold score associated with the interactive viewing experience, an enhanced viewing experience. The enhanced viewing device may also automatically display, based on the user's movements, an enhanced viewing experience. For example, the enhanced viewing device may determine a correlation between the movement threshold score and the movement value, and may select an enhanced viewing experience in which the correlation exceeds a determined threshold.

At step 380, the enhanced viewing device may display the enhanced viewing experience. The enhanced viewing device may output for display the selected enhanced viewing experience. The enhanced viewing experience may comprise an interactive virtual reality advertisement.

If a computing device other than the enhanced viewing device selects the enhanced viewing experience, the computing device may transmit, to the enhanced viewing device, the enhanced viewing experience. For example, the computing device may comprise a server associated with the enhanced viewing device. The server may transmit, to an enhanced viewing device for display, the enhanced viewing experience. The server may transmit the enhanced viewing experience to a computing system associated with the enhanced viewing device. The server may transmit all or a portion of the enhanced viewing experience. The enhanced viewing device may receive and display the enhanced viewing experience.

The enhanced viewing device may display the enhanced viewing experience during a second enhanced viewing experience, such as during a game that a user is playing, or during content that the user is viewing. For example, the enhanced viewing experience may be a floating sphere displayed within the second enhanced viewing experience, prompting the user to exit a first virtual environment of the second enhanced viewing experience, and to enter a second virtual environment of the transmitted enhanced viewing experience.

The enhanced viewing device may request the enhanced viewing experience selected at step 375. The enhanced viewing device may also display the enhanced viewing experience in the absence of additional enhanced viewing experiences. For example, a user may request transmission of a random enhanced viewing experience, or the enhanced viewing device may display recommendations to a user.

The enhanced viewing device may monitor a level of satisfaction with the enhanced viewing experience throughout the enhanced viewing experience, and may determine a new enhanced viewing experience, via the method 300, if the enhanced viewing device determines that the user may not be satisfied. For example, the boundary may change during the enhanced viewing experience, and the user may no longer be able to interact. The enhanced viewing device may also determine that the user is moving significantly more or less than they were at the beginning of the enhanced viewing experience. The enhanced viewing device may determine this by analyzing current movements (such as movements occurring within a time threshold or movements occurring during the enhanced viewing experience) of the user in comparison to historical movements. The time threshold may be a predetermined time threshold. The enhanced viewing device may determine a new enhanced viewing experience and transition the user from the enhanced viewing experience to the new enhanced viewing experience which may prompt for an amount of movement that correlates to the user's new amount of movement.

Although the steps 305-380 are described above as being performed by the enhanced viewing device, some or all of the steps may also be performed by another computing device, such as a server. For example, movement data may be detected by the enhanced viewing device, and then transmitted upstream to the server for further processing, such as determination of the movement value, the boundary, the enhanced viewing experience, and the like. Although shown in an exemplary order, the steps 305-380 may be performed in a variety of orders, and should not be limited by the order shown in FIG. 3.

FIG. 4 shows an example boundary that defines user input parameters of a virtual reality engagement area. A boundary 410 may reflect spatial limitations associated with a user's ability to interact with an enhanced viewing experience. The enhanced viewing device may determine the boundary 410 based on a room scale configuration input, which may be input by a user. For example, the user may input the dimensions of the room in which the enhanced viewing device is used. After a user restarts the enhanced viewing device, the enhanced viewing device may assume the same room scale configuration that was previously used. For example, the enhanced viewing device may assume dimensions of the boundaries used during a previous session after the enhanced viewing device has been turned off and then turned on again. The enhanced viewing device may also begin the room scale configuration setup at the beginning of a new enhanced viewing session.

The enhanced viewing device may track recorded movements 420 associated with the enhanced viewing device. For example, the enhanced viewing device may store, at intervals, the user's location. The intervals may be predetermined intervals. This may result in a plurality of locations at which the user previously interacted with an enhanced viewing experience on the enhanced viewing device. This plurality of locations may comprise the recorded movements 420. The enhanced viewing device may determine the boundary 410 based on the recorded movements 420 associated with the enhanced viewing device.

The enhanced viewing device may transmit, to a server associated with the enhanced viewing device, the boundary. The server may select, based on the boundary, a subsequent enhanced viewing experience. The enhanced viewing device may transmit, to the server, the room scale configuration and/or the historical data, and the server may determine, based on the room scale configuration and/or the historical data, the boundary 410.

FIG. 5 shows an example boundary, within a user defined boundary such as the example boundary described above at FIG. 4, defining a synthesized virtual reality engagement area that may be based on user input parameters and additional data (historical movement patterns, placement of furniture, and the like). This example boundary may comprise the boundary determined above at step 325 of the method 300. A user may input, to an enhanced viewing device, such as the enhanced viewing device, the dimensions of his/her living room. The user may input the dimensions using, for example, a hand controller associated with the enhanced viewing device. The hand controller may allow the user to scroll up and down in dimensions, which may be displayed on a screen comprising the enhanced viewing device, until the user reaches the desired dimensions. For example, the user may typically engage in enhanced viewing experiences in his/her living room, and may define the desired dimensions as thirty feet by thirty feet. The desired dimensions may comprise an initial boundary 510. The enhanced viewing device may determine the initial boundary 510. The enhanced viewing device may also have previously determined historical data 520 associated with the enhanced viewing device. The historical data 520 may correspond to recorded movements made by the user during previous enhanced viewing experiences. Based on the historical data 520, the enhanced viewing device may determine that, although the user defined the initial boundary 510, he/she really limits his/her movements to within a determined boundary 530. For example, although the user's living room may be thirty feet by thirty feet, he/she may have furniture (e.g., couches, chairs, tables, and the like) that impedes movement in certain areas of the room. The enhanced viewing device may adjust the initial boundary determined via the room scale configuration input from the user, based on the historical data 520. This may result in the determined boundary 530.

The enhanced viewing device may also transmit, to a server associated with the enhanced viewing device, the initial boundary 510 and the historical data 520, in which case the server may determine the determined boundary 530.

FIG. 6 shows an example of an interactive advertisement index 610 comprising correlations between interactive advertisements and an amount of movement prompted for by each of the interactive advertisements. A server associated with the enhanced viewing device may store and update the interactive advertisement index 610. The enhanced viewing device may also store and update the interactive advertisement index 610. The enhanced viewing experiences, that may comprise a plurality of interactive advertisements or other interactive content, may be listed in an enhanced viewing experience index such as the interactive advertisement index 610. The server or the enhanced viewing device may assign, to each of a plurality of interactive advertisements, a movement threshold score based on the movement value associated with each of the plurality of interactive advertisements. The higher the movement threshold score, the more movement prompted for by the interactive advertisement. The interactive advertisement index 610 lists a boxing advertisement, a soccer advertisement, and a card game advertisement, which correspond to movement threshold scores of 8/10, 10/10, and 2/10 respectively. The movement threshold score may comprise an aggregate of movement information associated with an interactive advertisement. For example, the movement threshold score may take into account information such as an amount of movement to the left that may be prompted for, an amount of movement to the right that may be prompted for, a speed of the movement to the left, a speed of the movement to the right, ability to engage while sitting, ability to engage while standing, minimum dimensions of the necessary interaction area, and the like. These pieces of account information may correspond to more detailed scores respectively. For example, the speed of movement to the left may comprise a score of 85/100 which may indicate that the corresponding interactive advertisement may prompt for fast movements to the left. A movement threshold score of 10/10 may correspond to an advertisement prompting for the most motion, whereas a movement threshold score of 1/10 may correspond to an advertisement prompting for the least motion. For example, an interactive advertisement prompting the user to engage as a player in a soccer game may prompt for more movement than an interactive advertisement prompting the user to engage in a card game. The card game may prompt a user merely for hand gestures using, for example, hand controllers associated with the enhanced viewing device. The card game may not require a user to stand or move around. Hence the movement threshold score of 2/10. The soccer advertisement may prompt the user to move around the room and to simulate kicking a ball. Hence the movement threshold score of 10/10. The boxing advertisement may prompt the user for more movement than the card game, but less than the soccer advertisement. Hence the movement threshold score of 8/10. Although the interactive advertisement index 610 is described with regards to interactive advertisements, it should be recognized that this index may contain any type of enhanced viewing experience.

Figure 7A:
FIG. 7A shows an example distance moved over time during a virtual reality experience, as determined by an enhanced viewing device.
Figure 7B:
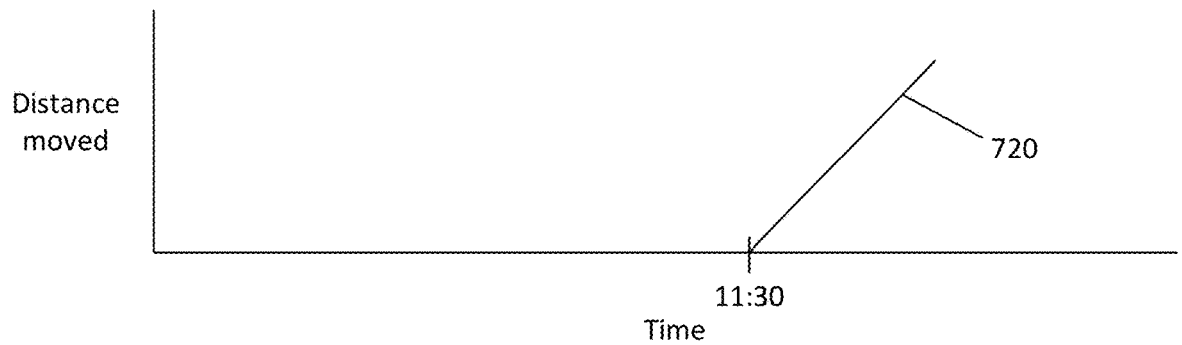
FIG. 7B shows an example distance moved over time during a virtual reality experience, as determined by an enhanced viewing device.
Figure 7C:
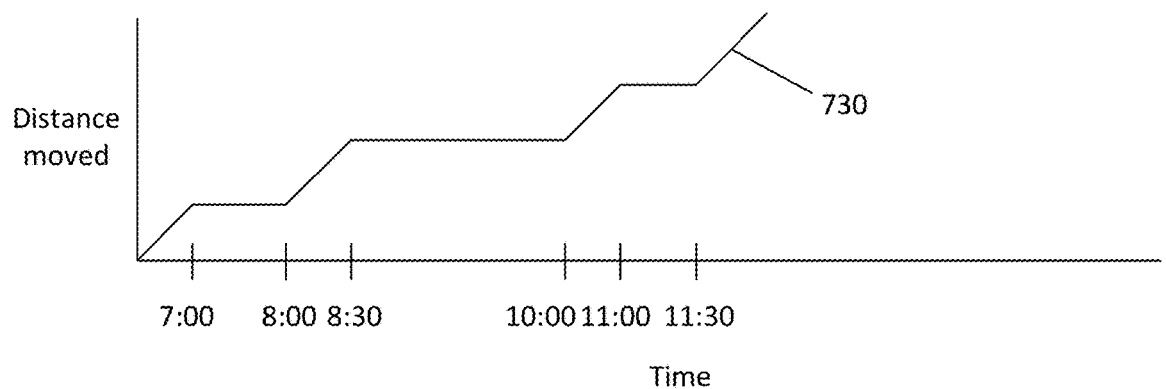
FIG. 7C shows an example distance moved over time during a virtual reality experience, as determined by an enhanced viewing device.

FIGS. 7A-C show distances moved over time during an enhanced viewing experience, as determined by an enhanced viewing device. For example, the enhanced viewing device may track and store information of a user's movements during engagement with enhanced viewing experiences, and may use the information to determine subsequent enhanced viewing experiences. The enhanced viewing device may use the information to determine the movement value described above at step 305. In FIG. 7A, an enhanced viewing device was moving at first, but then, at 8:30, stopped, as shown by tracked distance 710. For example, a user may have moved around at first, but then sat down. The enhanced viewing device may determine that, because the enhanced viewing device is no longer moving, the enhanced viewing device is associated with a low movement value. The enhanced viewing device may display an enhanced viewing experience. A server, associated with the enhanced viewing device, may determine that the enhanced viewing device is no longer moving. The determination may be based on the tracked distance 710, which the server may receive from the enhanced viewing device. The server may transmit an enhanced viewing experience associated with a low movement threshold score to the enhanced viewing device. The enhanced viewing device may use the tracked distance 710 to determine whether the user satisfies a movement threshold of the enhanced viewing experience. For example, the enhanced viewing device may select, based on the user's movements before 8:30, an enhanced viewing experience with a high movement threshold score. However, based on the user's movements after 8:30, the enhanced viewing device may determine that the user might not be meeting the movement threshold associated with the enhanced viewing experience, and may terminate the enhanced viewing experience and/or initiate a new enhanced viewing experience associated with a lower movement threshold.

In FIG. 7B, the enhanced viewing device previously stopped, but then, at 11:30, started moving, as shown by tracked distance 720. For example, a user may have sat down, but is now active and moving around the room. Based on the tracked distance 720, the enhanced viewing device may determine a high movement value, and may display an enhanced viewing experience associated with a high movement threshold score. The enhanced viewing device may use the tracked distance 720 to determine whether the user satisfies a movement threshold of the enhanced viewing experience. For example, the enhanced viewing device may select, based on the user's movements before 11:30, an enhanced viewing experience with a low movement threshold score. However, based on the user's movements after 11:30, the enhanced viewing device may determine that the user might be exceeding the movement threshold associated with the enhanced viewing experience and that the user might prefer an enhanced viewing experience associated with a higher threshold. The enhanced viewing device may terminate the enhanced viewing experience and/or initiate a new enhanced viewing experience associated with a higher movement threshold.

In FIG. 7C, the enhanced viewing device stopped and moved several times, as shown by tracked distance 730. The enhanced viewing device may determine, based on historical data such as the recorded movements 420, a movement value. The enhanced viewing device may use tracked distances 710, 720, 730 to determine a current speed of the enhanced viewing device. For example, enhanced viewing device may determine the current speed by dividing the distance moved by the time traveled. If the enhanced viewing device is traveling fast, the enhanced viewing device may determine a higher movement value than if the enhanced viewing device is traveling slowly. For example, a user may be covering a large distance, but may be engaging in enhanced viewing experiences related to taking a stroll through the woods. Thus, the enhanced viewing device may determine a low movement value. The user may be covering a large distance very quickly, and may be engaged in, for example, an enhanced viewing experience related to playing a soccer game. Thus, the enhanced viewing device may determine a high movement threshold.

Figure 8:
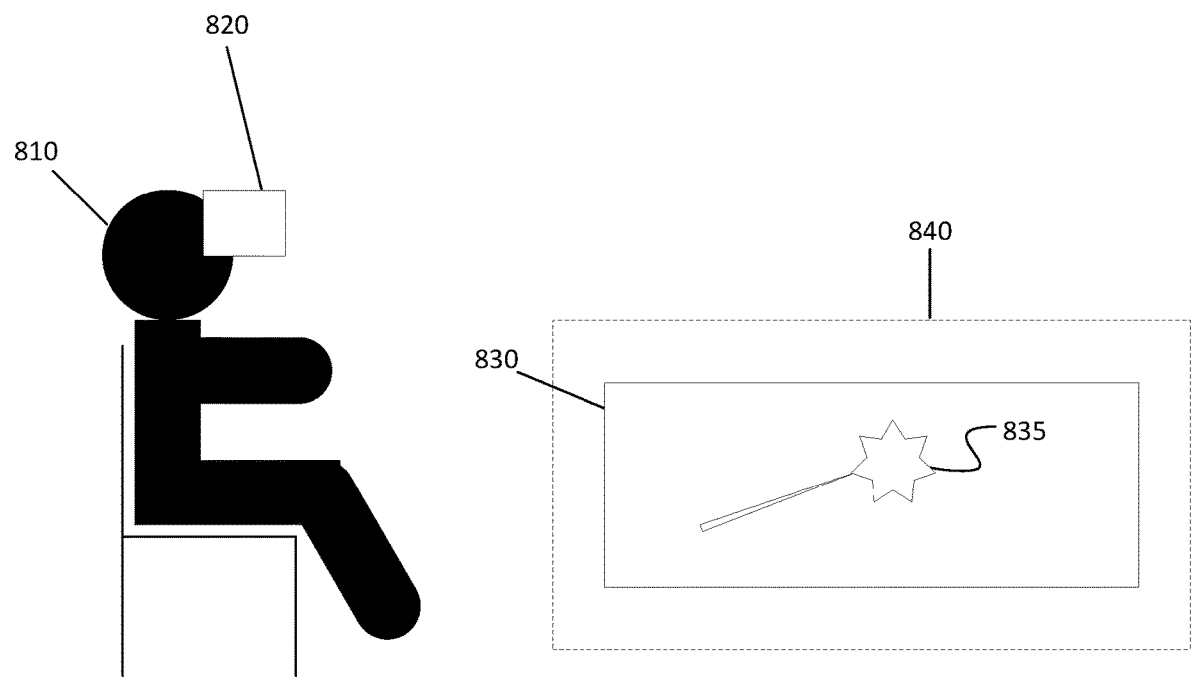
FIG. 8 shows an example of a seated enhanced viewing experience.

FIG. 8 shows an example of a seated enhanced viewing experience. A computing device, such as the enhanced viewing device 820 or a server associated with the enhanced viewing device 820, may determine that a user 810 is sitting. The computing device may determine that the user 810 is sitting, at least in part, by determining a height of the enhanced viewing device 820 relative to the ground. The computing device may determine, based on the determination that the user 810 is sitting, an enhanced viewing experience 830, associated with a low movement threshold score. The computing device may select, from an enhanced viewing experience index such as the interactive advertisement index 610, the enhanced viewing experience 830. The enhanced viewing device 820 may display, to the user 810, the enhanced viewing experience 830. The enhanced viewing experience 830 may be an interactive game or an interactive advertisement prompting the user 810 to cast spells with a magic wand 835. For example, the enhanced viewing experience 830 may prompt a user 810 to move a hand controller associated with the enhanced viewing device 820 to simulate waving the wand 835. The computing device may serve the enhanced viewing experience 830 to the user 810 via a screen 840 of the enhanced viewing device 820. For example, the enhanced viewing device 820 may comprise a Six Degrees of Freedom (DOF) VR headset such as an OCULUS RIFT™ or an HTC VIVE™.

The enhanced viewing device 820 may comprise a Three DOF headset such as a GEAR VR™ or a DAYDREAM™. The Three DOF headset, comprising the enhanced viewing device 820, may lack positional tracking. As a result, the enhanced viewing device 820 may determine a range of view for the user 810, and may select the enhanced viewing experience 830 based on the range of view. For example, the enhanced viewing device 820 may determine that the user 810 is seated in an area with limited space, such as a plane. As a result, the enhanced viewing experience 830 may prompt the user for small wrist movements and limited head rotation. Where the enhanced viewing device 830 determines that the user 810 has a wider range of view, an enhanced viewing experience prompting for more involved movements may be selected. The computing device may determine the example seated enhanced viewing experience via the method 300.

Figure 9:
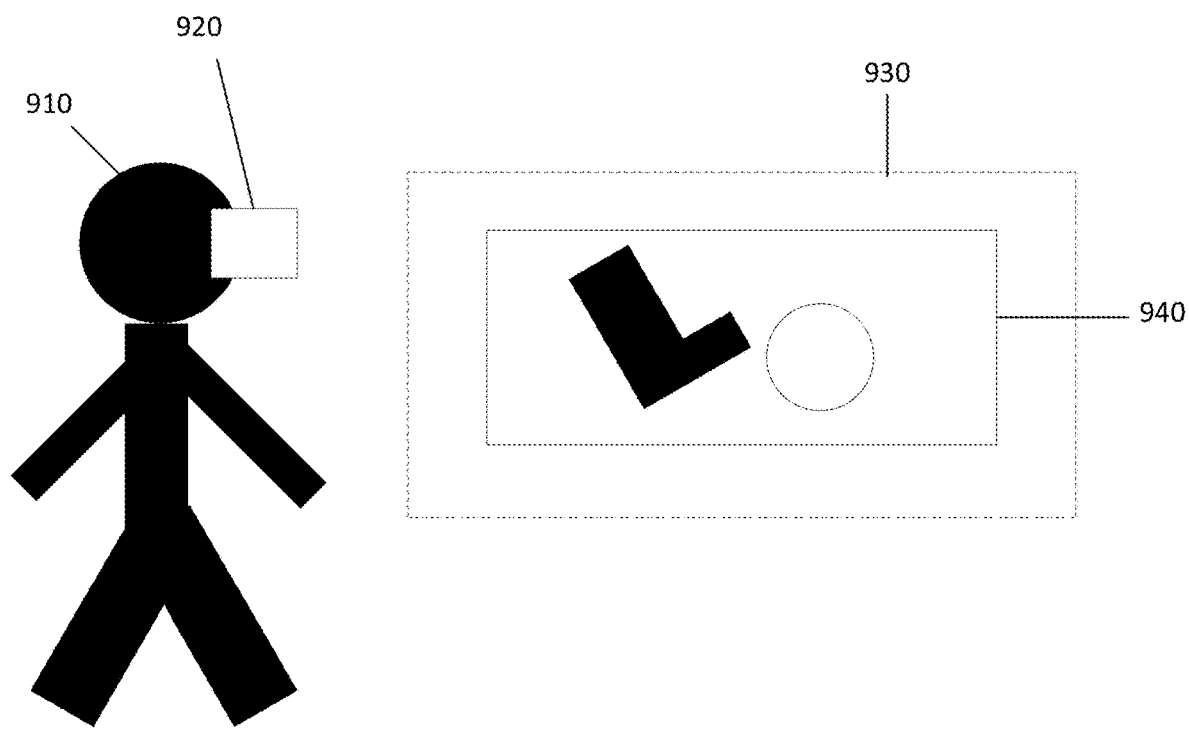
FIG. 9 shows an example of a standing enhanced viewing experience.

FIG. 9 shows an example of a standing enhanced viewing experience. After determining that a user 910 is standing, at least in part, by determining a height of the enhanced viewing device 920 relative to the ground, the enhanced viewing device may select an enhanced viewing experience 940. The enhanced viewing device may select an enhanced viewing experience 940, associated with a high movement threshold score, from an enhanced viewing experience index, such as the interactive advertisement index 610. The enhanced viewing device 920 may then display the enhanced viewing experience 940 to the user 910. For example, the enhanced viewing experience 940 may be an interactive game or an interactive advertisement prompting the user 910 to engage in a virtual soccer experience. The enhanced viewing experience 940 may prompt a user 910 to run around and simulate kicking a ball. The enhanced viewing device may serve the enhanced viewing experience 940 to the user 910 via a screen 930 of the enhanced viewing device 920. The example standing enhanced viewing experience may be determined via the method 300.

Figure 10A:
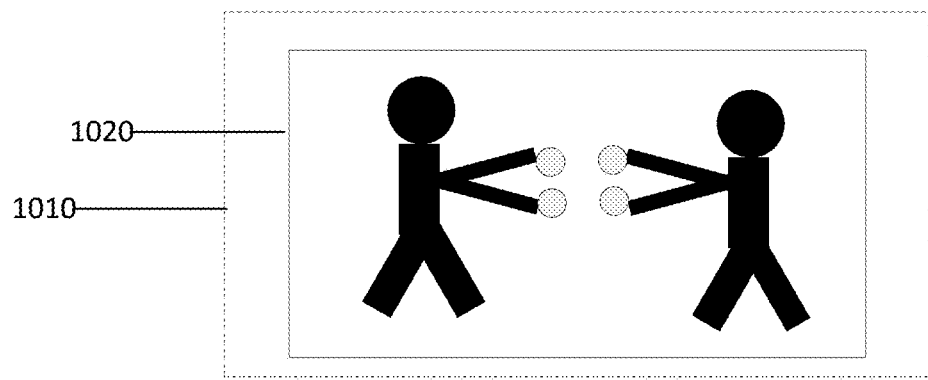
FIG. 10A shows an example enhanced viewing device display.
Figure 10B:
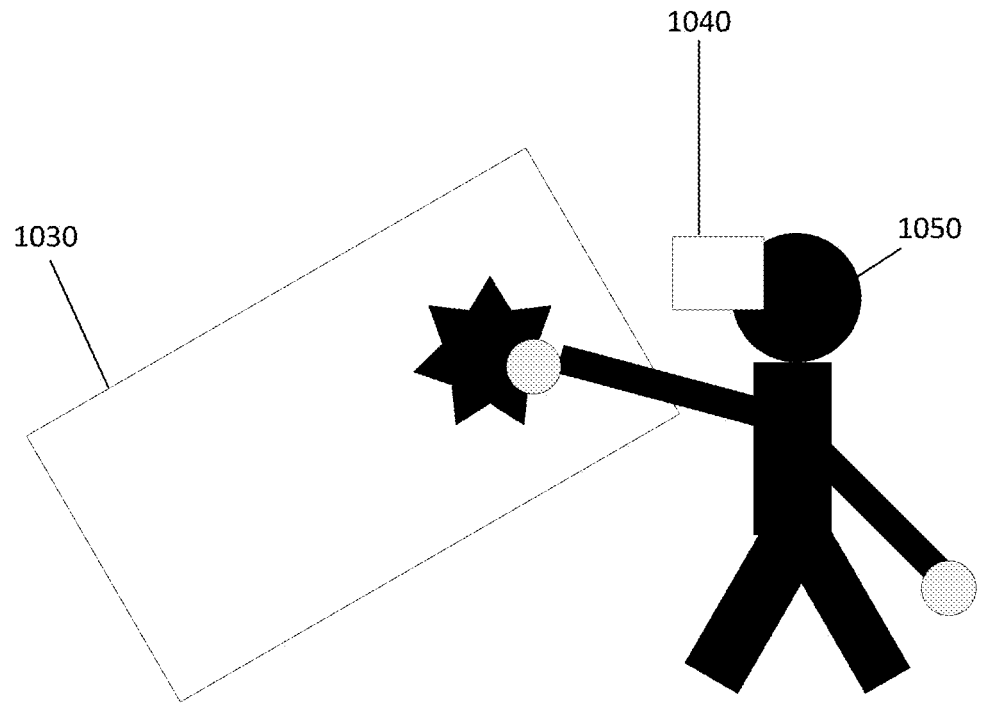
FIG. 10B shows an example violation of a boundary by a user, while engaging in an enhanced viewing experience.

FIGS. 10A-B show an example enhanced viewing experience display and an example violation of a boundary by a user while engaging in an enhanced viewing experience. The enhanced viewing device may determine, via the method 300, a boundary, such as the boundary 410, and may select, for display and based on spatial constraints associated with the boundary, an enhanced viewing experience. A benefit of this determination and selection is that they may prevent a user from violating the boundary and, for example, breaking a wall or items located around a room during an enhanced viewing experience. FIG. 10A shows an example enhanced viewing experience display. For example, a user may view an enhanced viewing experience 1020 via a display 1010 comprising an enhanced viewing device 1040. In FIG. 10B, the enhanced viewing device 1040 may be associated with a high movement value. Thus the enhanced viewing device 1040 may select, based on the high movement value, an enhanced viewing experience 1020, and may display, to a user 1050 and via the display 1010 of the enhanced viewing device 1040, the enhanced viewing experience 1020. For example, the enhanced viewing experience 1020 may prompt the user 1050 to throw punches at an opposing boxer. If the selection of the enhanced viewing experience does not take into account the user 1050's location in front of the television screen 1030, the user 1050 may punch through the television screen 1030.

Figure 11A:
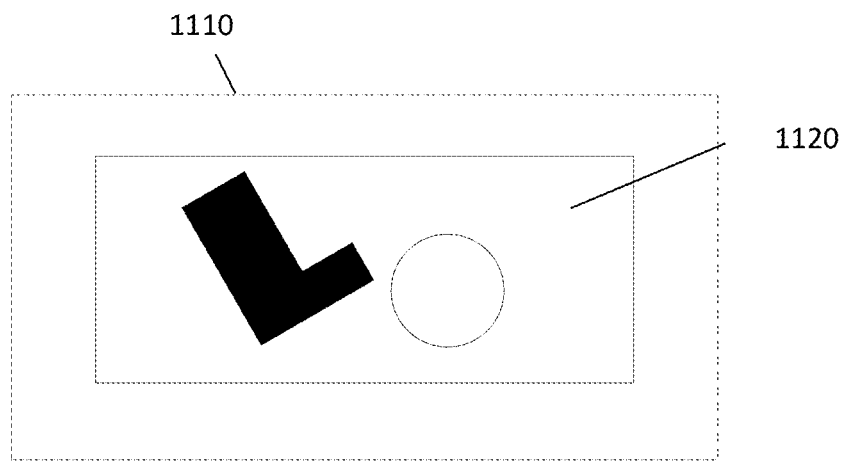
FIG. 11A shows an example enhanced viewing device display.
Figure 11B:
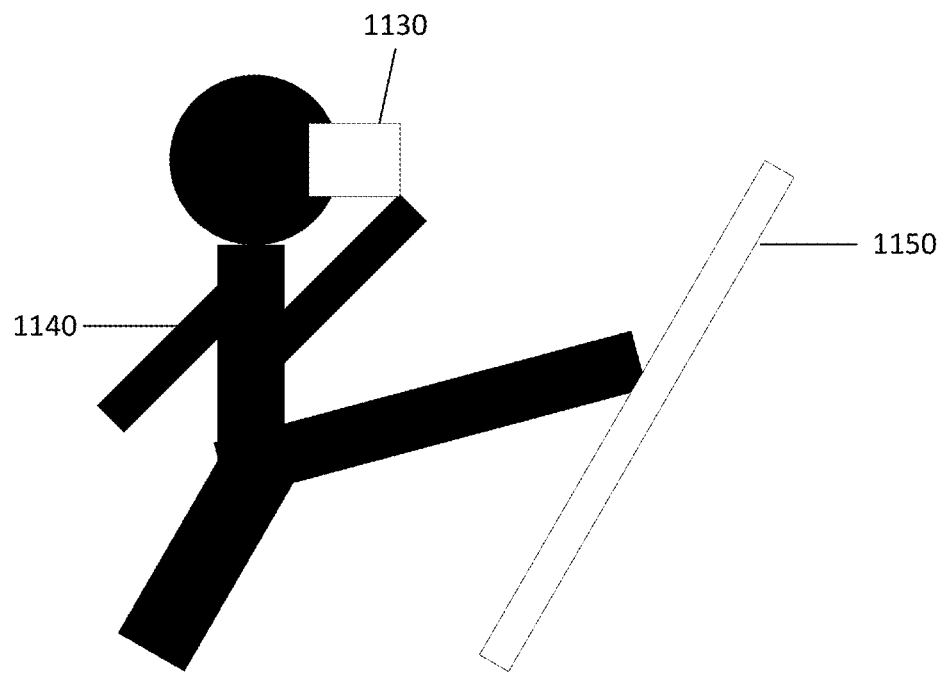
FIG. 11B shows an example violation of a boundary by a user, while engaging in an enhanced viewing experience.

FIGS. 11A-B show an example enhanced viewing experience display and an example violation of a boundary by a user while engaging in an enhanced viewing experience. An enhanced viewing device 1130 may determine, via the method 300, a boundary, such as the boundary 410. The enhanced viewing device 1130 may select, for display and based on spatial constraints associated with the boundary, an enhanced viewing experience. A benefit of this determination and selection is that they may prevent a user from knocking over items located around a room during an enhanced viewing experience. FIG. 11A shows an example enhanced viewing experience display. For example, a user may view an enhanced viewing experience 1120 via a display 1110 comprising an enhanced viewing device 1130. The enhanced viewing device 1130 may be associated with a high movement value, and thus the enhanced viewing device 1130 may select, based on the high movement value, the enhanced viewing experience 1120. The enhanced viewing device 1130 may display, to a user 1140 and via the display 1110 of the enhanced viewing device 1130, the enhanced viewing experience 1120. For example, the enhanced viewing experience 1120 may prompt the user 1140 to engage in a virtual soccer game, including prompts to run and to kick a ball. A boundary for the enhanced viewing experience 1120, as determined by the enhanced viewing device, may comprise a 20 ft by 20 ft space. A sensor device 1150 may be located outside the 20 ft by 20 ft space. By determining and/or selecting the enhanced viewing experience based on the boundary, the enhanced viewing device may prevent the user from knocking over items outside of the 20 ft by 20 ft space. If the selection of the enhanced viewing experience 1120 does not take into account the user 1140's location next to a sensor device 1150 associated with the enhanced viewing device 1130, the user 1140 may kick over to the sensor device 1150, as shown in FIG. 11B.

Figure 12A:
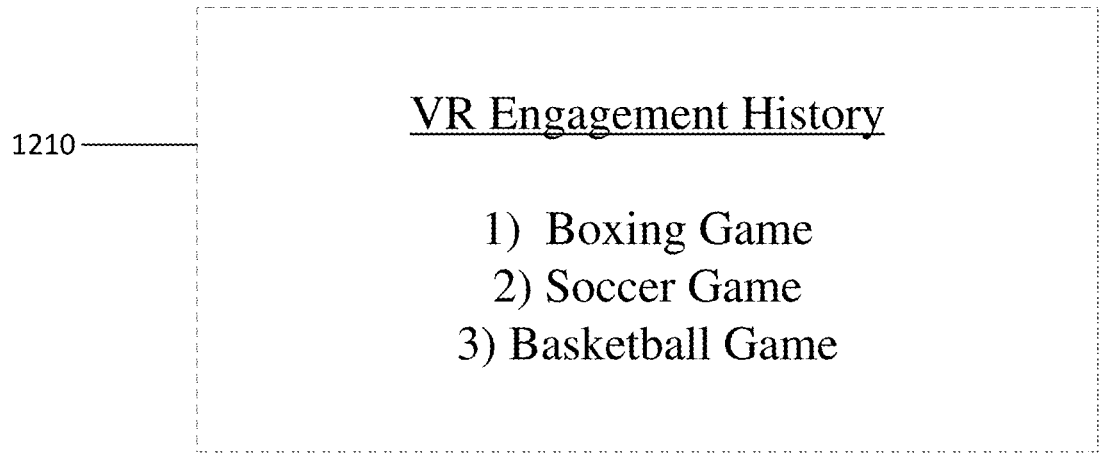
FIG. 12A shows an exemplary viewing experience history associated with high movement threshold enhanced viewing experiences.
Figure 12B:
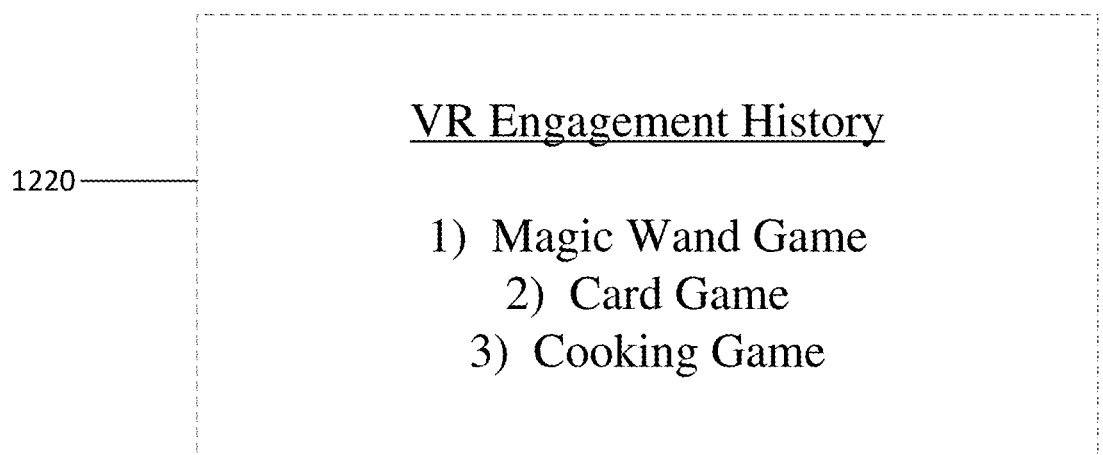
FIG. 12B shows an exemplary viewing experience history associated with low movement threshold experiences.

FIGS. 12A-B show enhanced viewing experience histories 1210 and 1220, which are associated with high movement threshold experiences and low movement threshold experiences, respectively. An enhanced viewing device, such as the enhanced viewing device, may select, based on the enhanced viewing experience histories 1210 and 1220, an enhanced viewing experience. For example, the enhanced viewing device may maintain the user's virtual reality engagement history. FIG. 12A shows a history including a boxing game, a soccer game, and a basketball game. The enhanced viewing device may determine that the user associated with the virtual reality engagement history may be historically active, and may prefer enhanced viewing experiences associated with a high movement threshold score. FIG. 12B shows a history including a magic wand game, a card game, and a cooking game. The enhanced viewing device may determine that the user associated with the virtual reality engagement history may be historically stagnant, and may prefer enhanced viewing experiences associated with a low movement threshold score.

Figure 13:
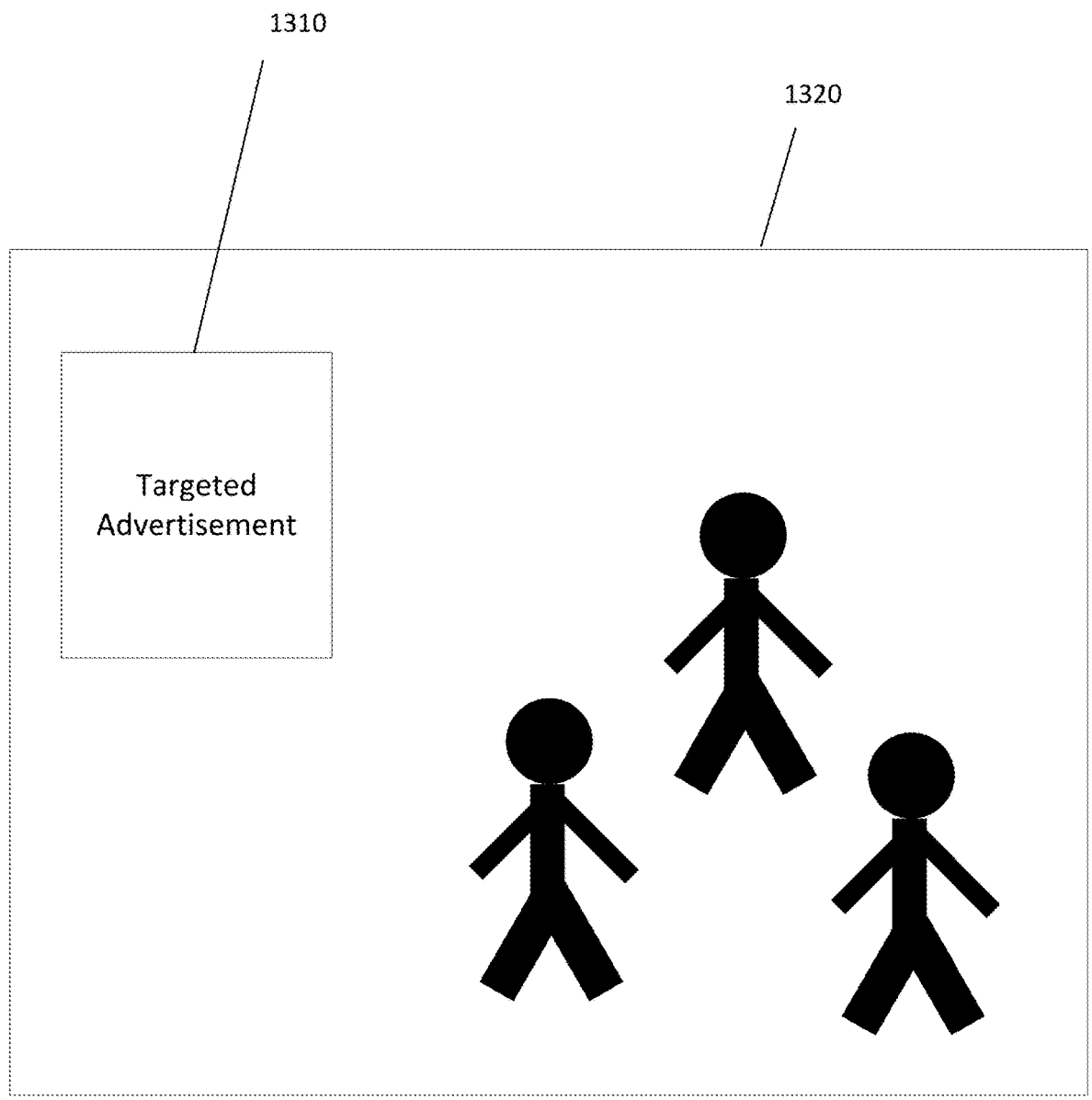
FIG. 13 shows an example targeted enhanced viewing experience selected based on location.

FIG. 13 shows an example targeted enhanced viewing experience based on location. In FIG. 13, a user may be walking around while wearing an enhanced viewing device. For example, the enhanced viewing device may comprise augmented reality glasses. The enhanced viewing device may superimpose an advertisement in reality based on a determination of the user's location. FIG. 13 shows a user engaging in an enhanced viewing experience 1320 by walking into a bar. An enhanced viewing device may determine the user is in the bar, and may display an advertisement for beer 1310. A user may be engaged in an AR experience, and may walk into a bar. The enhanced viewing device may determine that the user is in the bar, and may superimpose, in a picture frame on a wall in the bar, the advertisement for beer 1310.

Figure 14A:
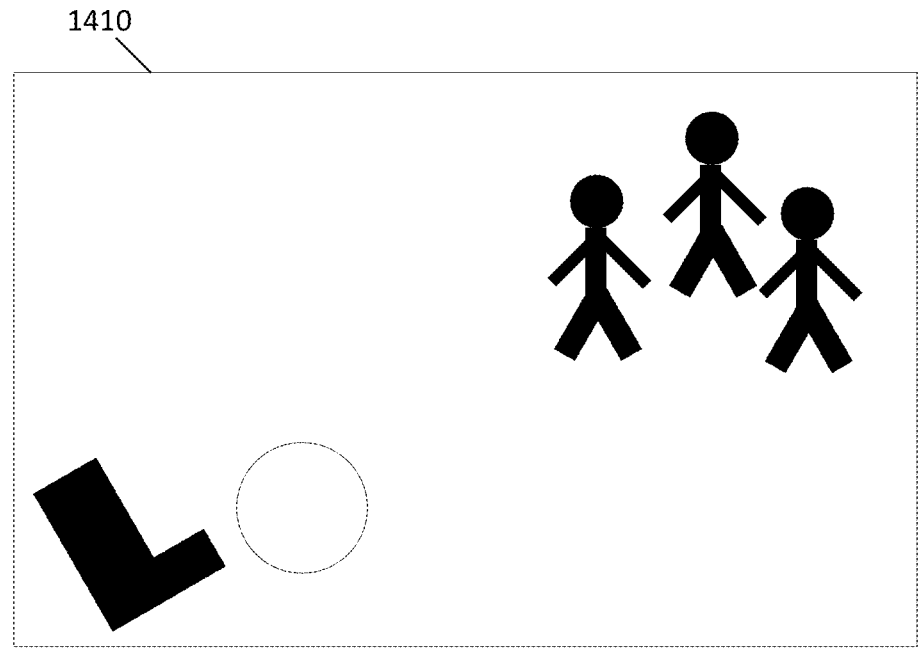
FIG. 14A shows an enhanced viewing experience, associated with a high movement threshold, wherein one of a plurality of soccer players corresponds to the user.
Figure 14B:
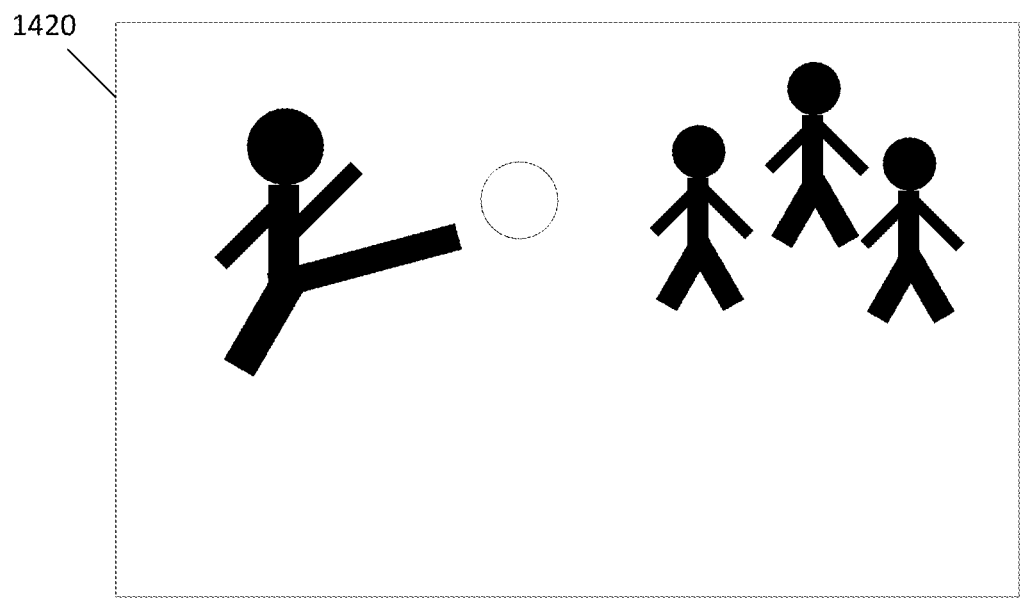
FIG. 14B shows the enhanced viewing experience, associated with a low movement threshold, wherein one of a plurality of fans corresponds to the user.

FIGS. 14A-B show multiple viewpoints, associated with a high movement threshold and a low movement threshold respectively, for an enhanced viewing experience. For example, an interactive advertisement may comprise a virtual reality advertisement. There may be a plurality of characters that may embody a user. The virtual reality advertisement may comprise an advertisement for tickets to a soccer game and the virtual reality advertisement may comprise a virtual soccer environment. For example, the soccer game may involve a plurality of players and a plurality of fans. Based on a movement value associated with an enhanced viewing device, an enhanced viewing device may determine which of the plurality of characters to use to embody the user. The enhanced viewing device may determine the movement value based on methods described at step 305. For example, FIG. 14A shows an enhanced viewing experience 1410 in which one of the plurality of players may correspond to the user. The enhanced viewing device may determine a high movement value, and may select, based on the determination, a character. While embodied by the one of the plurality of players, the enhanced viewing experience 1410 may prompt the user for a high level of movement, such as running around and kicking a soccer ball. FIG. 14B shows an enhanced viewing experience 1420 in which one of a plurality of fans may correspond to the user. For example, the enhanced viewing device may determine a low movement value, and the enhanced viewing device may select a character based on the determination. While embodied by the one of the plurality of fans, the user may not be prompted for as much movement as in FIG. 14A. For example, the enhanced viewing experience 1420 may prompt the user to clap or sit and stand up at certain times (e.g., do the wave on command).

Figure 15A:
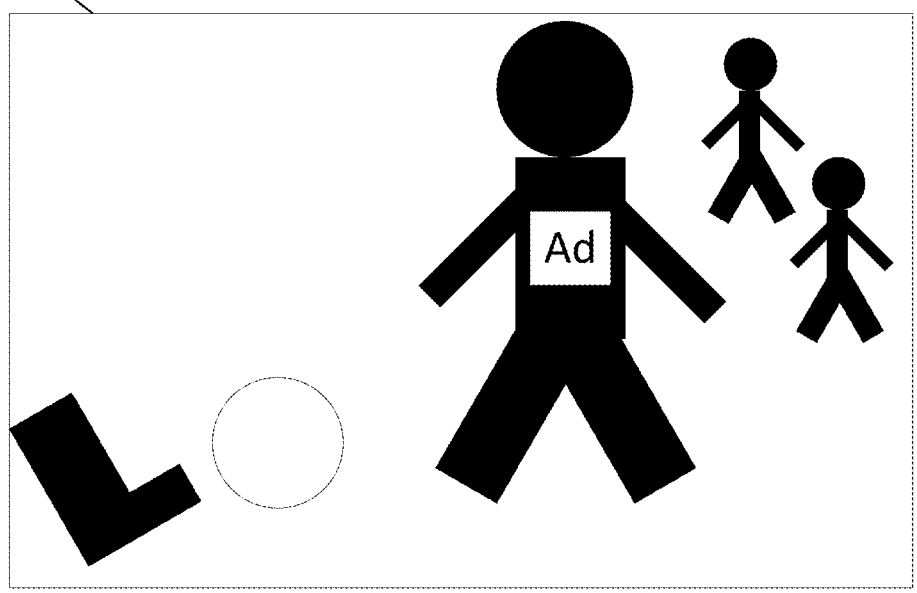
FIG. 15A shows a player viewing perspective, comprising a cooperative enhanced viewing experience, for an advertisement.
Figure 15B:
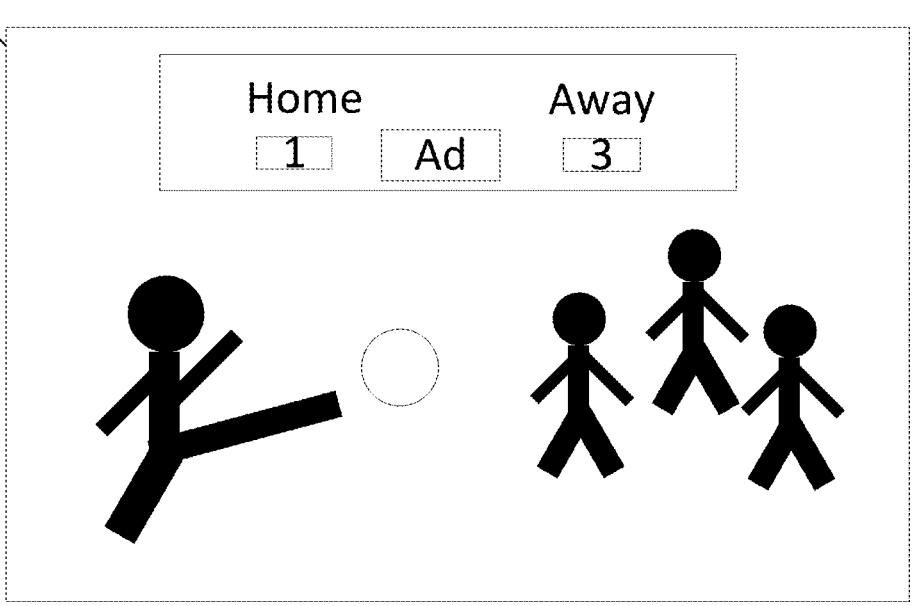
FIG. 15B shows a crowd viewing perspective, comprising a solo enhanced viewing experience, for an advertisement.

FIGS. 15A-B show different viewing perspectives, associated with a cooperative enhanced viewing experience and a solo enhanced viewing experience respectively, on an advertisement. An enhanced viewing device may determine whether a user prefers cooperative enhanced viewing experiences to solo enhanced viewing experiences. For example a cooperative enhanced viewing experience may comprise a VR experience in which a user may compete against or cooperate with additional users. A solo enhanced viewing experience may comprise a VR experience in which a user may compete against or cooperate with a computing device. For example, the enhanced viewing device may determine, based on enhanced viewing experience histories, which enhanced viewing experiences the user prefers. The enhanced viewing device may also determine, based on previous interactions in enhanced viewing experiences, which enhanced viewing experiences the user prefers. The enhanced viewing device may also determine, based on a movement value associated with the enhanced viewing device, which enhanced viewing experiences the user prefers.

FIG. 15A shows an enhanced viewing experience 1510 that implements a player viewing perspective for an advertisement. Based on a determination that a user prefers cooperative enhanced viewing experiences, the enhanced viewing device may have the user correspond to one of a plurality of soccer players in a soccer game. The enhanced viewing device may place advertisements for a cola on jerseys of other soccer players in the plurality of soccer players. For example, because the user is engaged in the enhanced viewing experience 1510 from the perspective of the one of the plurality of soccer players, he or she may be able to read the advertisements on the jerseys of the other soccer players.

FIG. 15B shows an enhanced viewing experience 1520 that implements a crowd viewing perspective for an advertisement. The enhanced viewing device may, based on a determination that the user prefers solo viewing experiences, have the user correspond to one of a plurality of fans at the soccer game. The enhanced viewing device may place advertisements for the cola on jumbotron screens in a soccer stadium. For example, because the user is engaged in the enhanced viewing experience 1520 from the perspective of the one of the plurality of fans, he or she will likely be unable to read an advertisement on the jerseys of the plurality of players. The user likely will be able to read an advertisement placed on the jumbotron.

Figure 16:
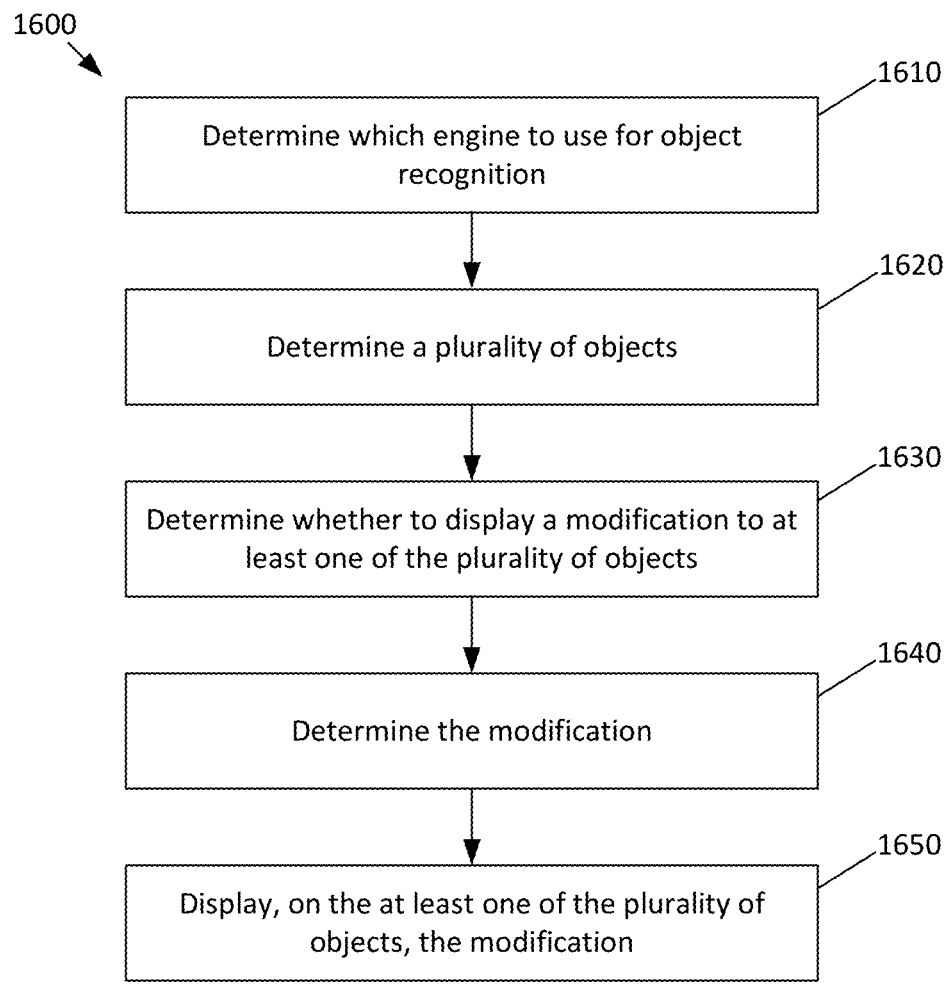
FIG. 16 is a flow diagram of a method for real-world object recognition to help facilitate superposition of an image in an enhanced viewing experience.

FIG. 16 is a flow diagram of a method 1600 for using real-world object recognition to help facilitate superposition of an image in an enhanced viewing experience. One or more steps may be performed by one or more computing devices or entities. Some or all of the steps may also or alternatively be performed by components of the network 100 or the computing device 200. Some or all of the steps thereof may be embodied in computer-executable instructions that are stored in a computer-readable medium, such as a non-transitory computer readable medium. The steps in this flow diagram need not all be performed in the order specified and some steps may be omitted or changed in order.

At step 1610, an enhanced viewing device may determine an object recognition engine. For example, the enhanced viewing device may receive an object recognition input indicating which object recognition engine to use. The enhanced viewing device may comprise AR glasses. Different object recognition engines are available, each with a different capability of recognizing objects. A first object recognition engine that can better determine objects may be more expensive than a second object recognition engine that cannot determine objects as well as the first object recognition engine.

At step 1620, the enhanced viewing device may determine a plurality of objects. The object recognition engine may determine a basic understanding of space that a user is in. The object recognition engine may engage in depth mapping of the space. For example, the enhanced viewing device may determine the user's location in the space and the direction that he or she is facing. The object recognition engine may recognize objects only where the cost of the recognition is paid by a sponsor. For example, the sponsor may be the producer of the objects.

At step 1630, the enhanced viewing device may determine whether to display a modification to at least one of the objects. The enhanced viewing device may determine what a user is looking at based on an orientation vector associated with the enhanced viewing device. The enhanced viewing device may determine how likely a user is to look in a certain direction based on historical data.

At step 1640, the enhanced viewing device may determine a modification to at least one of the objects. For example, the enhanced viewing device may map a board game to a flat surface. The enhanced viewing device may modify a real painting or a wall to display a virtual video. The enhanced viewing device may replace a plain office desk with a fancy office desk. An object may have an image on it to trigger an augmented reality experience. For example, a cola can may have an airplane on it, and when viewed via the enhanced viewing device, the airplane may take off and fly around the room.

The object recognition engine may prioritize objects on which to perform recognition. For example, the object recognition engine may display the cola company ad in a real picture frame if the cola company pays for the object recognition. If the cola company pays for object recognition in an entire room, the cola company may be able to place ads on any object in the room. If the cola company sponsors the object recognition, the enhanced viewing device may display a label from the cola company on cans regardless of whether they are a product of the cola company. If the cola company pays to sponsor object recognition in a room, the object recognition may recognize cans that are products of the cola company, but may refuse to do so for cans produced by competitors of the cola company.

At step 1650, the enhanced viewing device may display the modification. The enhanced viewing device may display the modification on at least one object recognized via the object recognition engine. AR glasses may superimpose the modification on the object. The AR glasses may receive redirected light waves from the real world, and may create artificial light via a plurality of LEDs and then redirect the artificial light. The AR glasses may combine a computer generated image with a user's perception of the real world via a combiner. The AR glasses may mix digital images with the real world, and may display the mix to the user.

Although the steps 1610-1650 are described above as being performed by the enhanced viewing device, some or all of the steps may also be performed by another computing device, such as a server. For example, data may be collected by the enhanced viewing device, and then transmitted upstream to the server for further processing, such as determination of the modification and the like. Although shown in an exemplary order, the steps 1610-1650 may be performed in a variety of orders, and should not be limited by the order shown in FIG. 16.

Figure 17A:
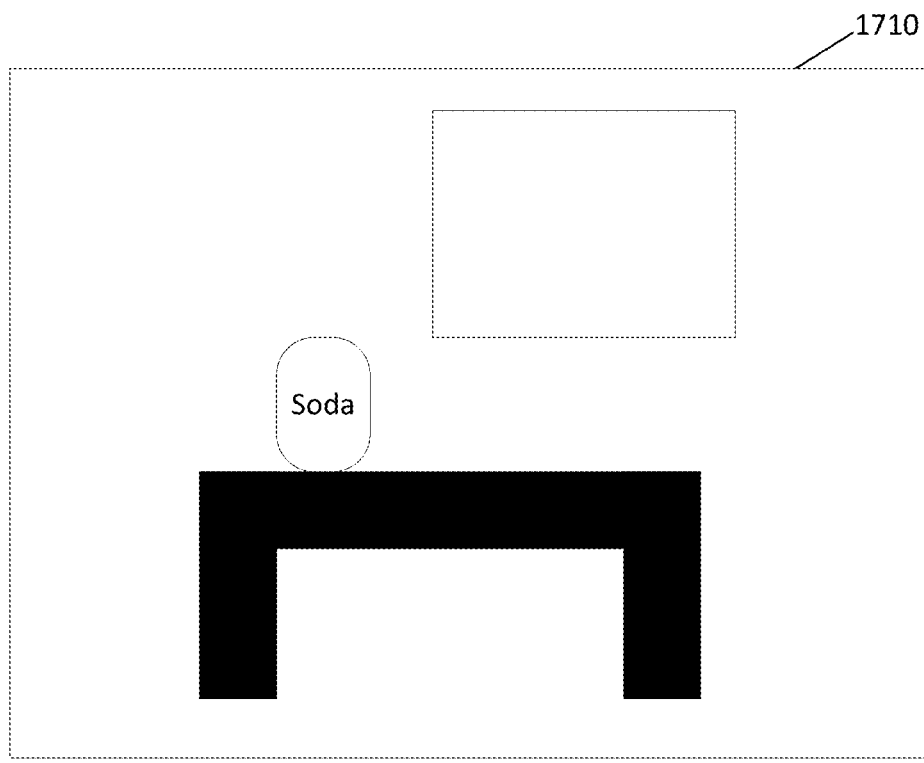
FIG. 17A shows an office before an enhanced viewing experience is engaged.
Figure 17B:
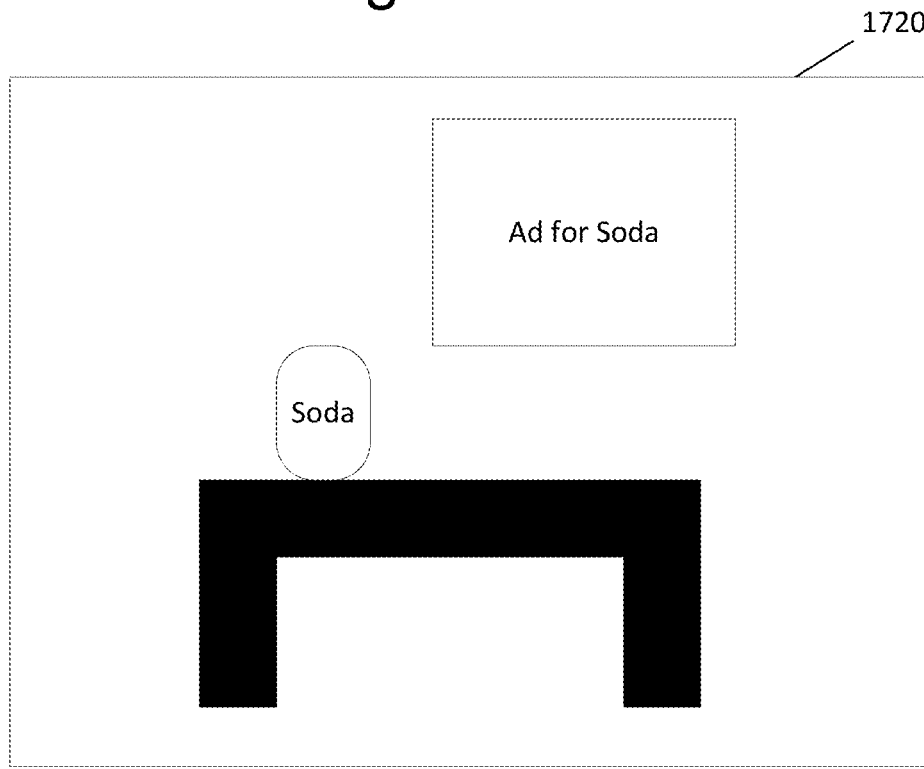
FIG. 17B shows the office after the enhanced viewing experience is engaged.

FIGS. 17A-B show an example of object recognition based on an orientation of an enhanced viewing device. An enhanced viewing device may determine that a user is looking a certain direction. For example, an object recognition engine may recognize a can on a desk, in an office, as a can from the cola company. The enhanced viewing device may determine that the user is interested in the cola company because he or she is facing the can, and thus the enhanced viewing device may place an advertisement for the cola company in a picture frame behind the desk. The cola company may have sponsored the object recognition of the can and the picture frame. FIG. 17A shows the office 1710 before the enhanced viewing experience is engaged. FIG. 17B shows the office 1720 after the enhanced viewing experience is engaged.

Figure 18:
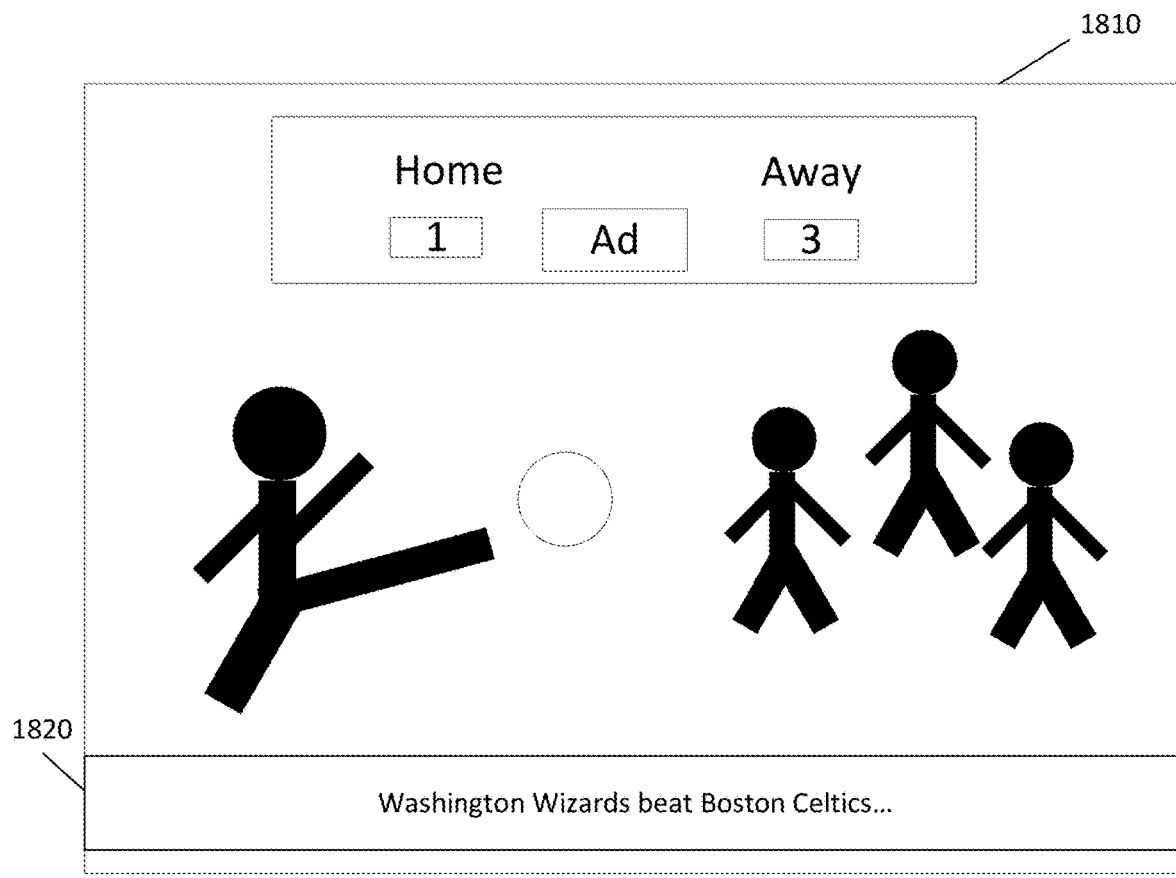
FIG. 18 shows an enhanced viewing experience comprising an example of a video content overlay based on a location.

FIG. 18 shows an enhanced viewing experience comprising an example video content overlay based on a location. A user may be away from home and may be watching a football game on a television 1810 in a sports bar. An enhanced viewing device may overlay a personalized sports ticker 1820 at the bottom of the television indicating sports news associated with the user's home teams. For example, the user may be in Chicago, but may be from Washington D.C. The personalized sports ticker 1820 may display scores from teams associated with Washington D.C., such as the Washington Wizards. The enhanced viewing device may comprise AR glasses such as a GOOGLE GLASS™ or a MICROSOFT HOLOLENS™.

Figure 19:
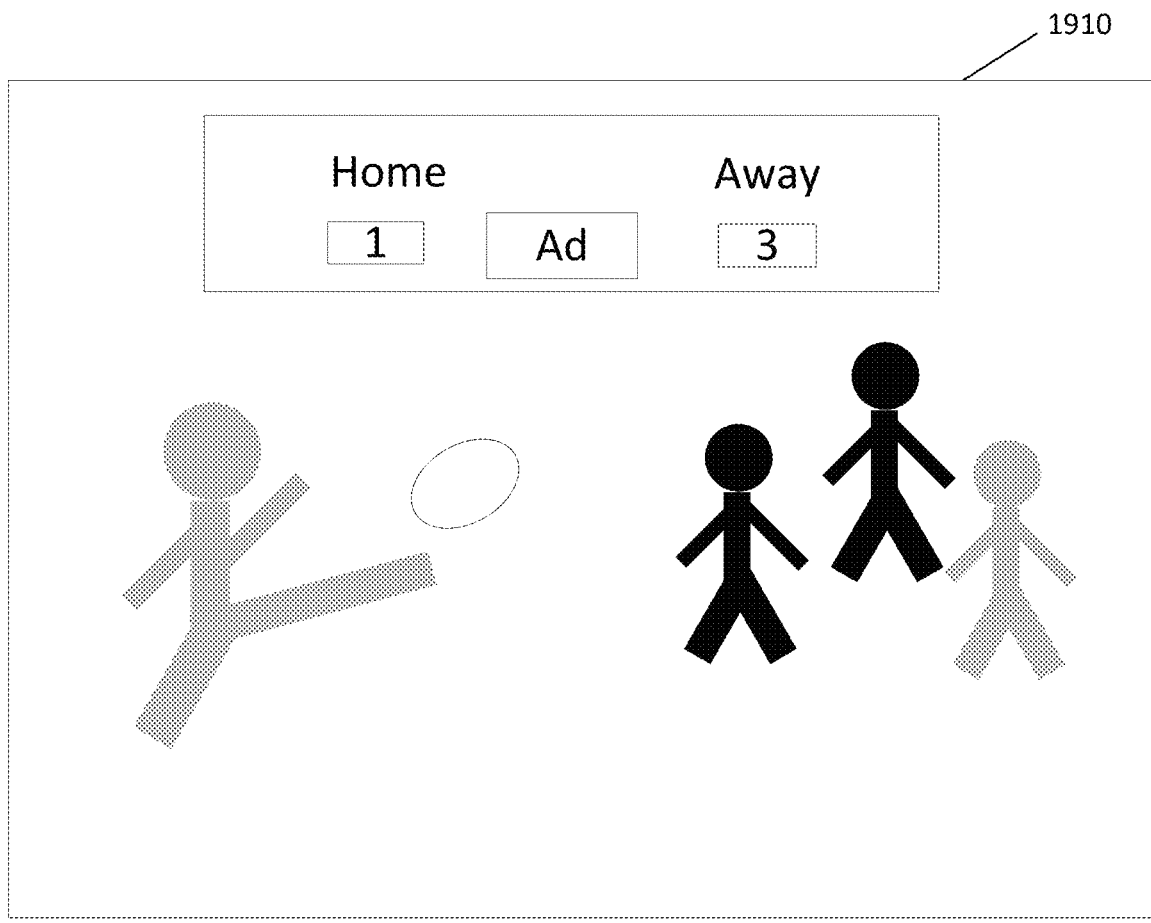
FIG. 19 shows an enhanced viewing experience comprising an example of a video content overlay based on user preferences.

FIG. 19 shows an enhanced viewing experience comprising an example video content overlay based on user preferences. A user may be watching a football game on a television 1910, and may be wearing an enhanced viewing device. The user may also be a participant in a fantasy football league, and may have selected a roster of players from different teams across the league. The enhanced viewing device may display an overlay on jerseys associated with players on the roster. For example, the enhanced viewing device may display an augmented reality overlay on the television to highlight the jerseys to make them easily recognizable when compared against other players.

Figure 20:
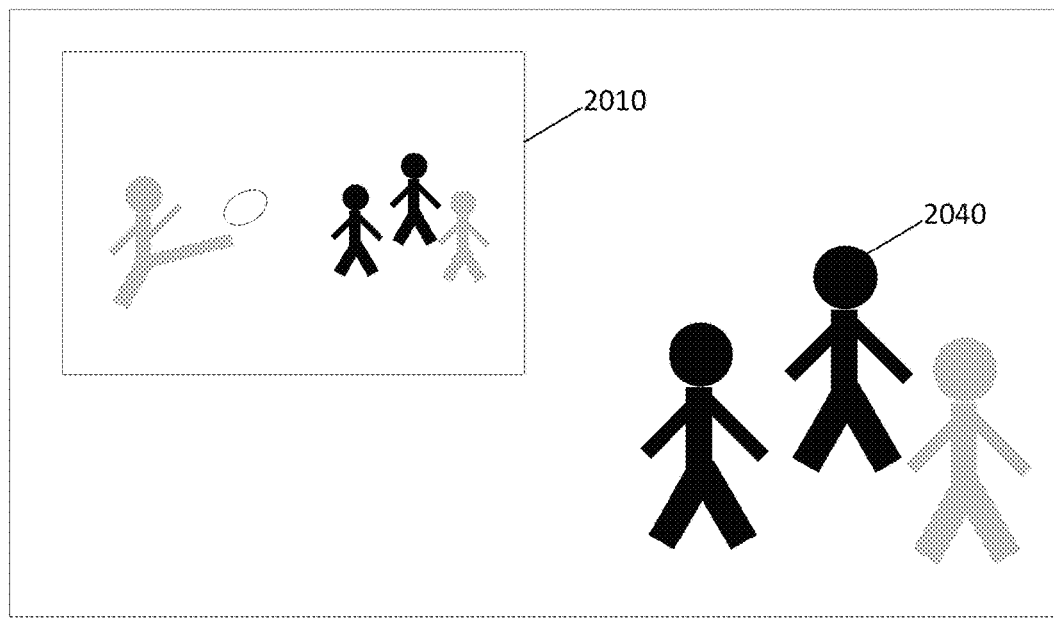
FIG. 20 shows an example of capturing and storing a sequence of real events, and generating, based on the sequence of real events, an enhanced experience, comprising the sequence of real events, for display via an enhanced viewing device.
Figure 20:
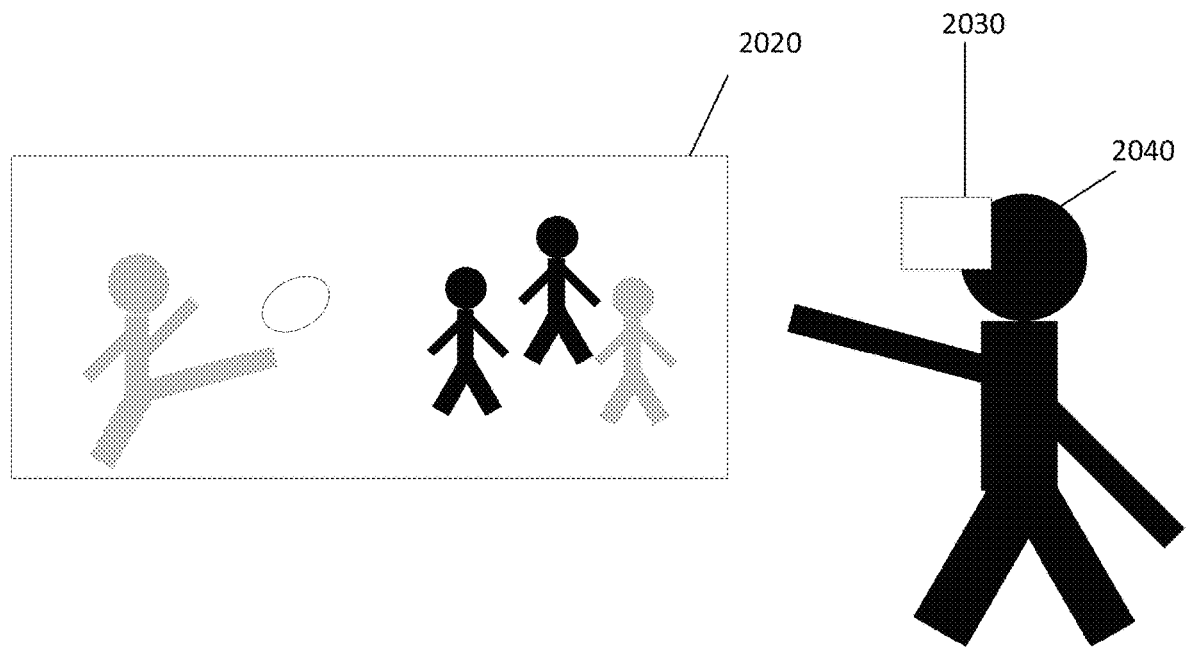

FIG. 20 shows an example of capturing and storing a sequence of real events, and generating, based on the sequence of real events, an enhanced viewing experience, comprising the sequence of real events, for display via an enhanced viewing device. For example, a user 2040 may be in a bar watching a football game on a TV 2010. The user 2040 may witness a great play on the TV 2010, and the user's eyes may widen in response to the great play. An enhanced viewing device 2030 may observe, for example, that the eyes widened at a certain time. The enhanced viewing device 2030 may determine, based on a plurality of factors, what the user 2040 is likely to be watching. For example, the enhanced viewing device 2030 may determine a popular sporting event based on the geographic area that the user 2040 is currently in. The popular sporting event may be determined based on information stored on, for example, the Comcast X1 platform. The enhanced viewing device 2030 may access a virtual, three-dimensional, replay 2020 of that moment during the game, and may store the replay for later. When the user 2040 returns home, he or she may access the virtual, three-dimensional, replay 2020 of the great play. The user 2040 may observe the replay 2020 on the enhanced viewing device 2030 as if he or she is on the field and is part of the play.

Although examples are described above, the various features and steps may be combined, divided, omitted, rearranged, revised or augmented in any desired manner. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting.

What is claimed is:

1. A method comprising:
   determining, by a computing device, at least a first enhanced viewing experience and a second enhanced viewing experience, wherein the first enhanced viewing experience is associated with a first physical activity level determined by aggregating one or more first user movements associated with the first enhanced viewing experience and the second enhanced viewing experience is associated with a second physical activity level determined by aggregating one or more second user movements associated with the second enhanced viewing experience;
   determining a historical physical activity level of a user, wherein the historical physical activity level of the user comprises a value indicating a level of movement made by the user during at least one prior enhanced viewing experience;
   selecting, based on a determination that an association between the historical physical activity level and the first physical activity level satisfies a selection threshold, the first enhanced viewing experience for output; and
   causing, based on the selecting, output of the first enhanced viewing experience.

2. The method of claim 1, wherein the aggregating one or more first user movements comprises determining a projected amount of user movement during an enhanced viewing experience.

3. The method of claim 1, wherein the first enhanced viewing experience is associated with an experience boundary.

4. The method of claim 1, further comprising:
   determining, by the computing device, a device boundary and a device location, wherein the determining the first enhanced viewing experience is further based on the device boundary and the device location.

5. The method of claim 1, further comprising:
   receiving an input comprising room dimensions; and
   determining, based on the room dimensions, a device boundary, and wherein the causing output of the first enhanced viewing experience is further based on the determined device boundary.

6. The method of claim 1, further comprising:
   determining, based on an orientation of the computing device, a device boundary, wherein the causing output of the first enhanced viewing experience is further based on the determined device boundary.

7. The method of claim 1, further comprising:
   determining a device boundary based on at least one movement of the computing device that occurs within a predetermined time period, wherein the causing output of the first enhanced viewing experience is further based on the determined device boundary and the at least one movement of the computing device.

8. The method of claim 1, further comprising:
   determining, based on movement of the computing device from a first device location to a second device location, a device boundary, and
   causing, based on the device boundary and the second device location, a second output of the second enhanced viewing experience.

9. The method of claim 1, further comprising:
   determining a height of the computing device; and
   determining, based on the height of the computing device, that a user is standing, wherein the causing output of the first enhanced viewing experience is further based on the determination that the user is standing.

10. The method of claim 1, wherein the causing output of the first enhanced viewing experience is further based on a determination that a user was previously standing during a majority of previous interactions.

11. The method of claim 1, further comprising:
    determining, by the computing device and based on at least one determined movement of one or more hand controllers corresponding to the computing device, a current physical activity level, wherein the causing output of the first enhanced viewing experience is further based on the current physical activity level.

12. The method of claim 1, wherein:
    the first enhanced viewing experience comprises video from a perspective of a first character;
    the second enhanced viewing experience comprises video from a perspective of a second character; and
    the method comprises:
       selecting between the first enhanced viewing experience and the second enhanced viewing experience based on a current physical activity level of the user.

13. The method of claim 1, wherein at least the first enhanced viewing experience and the second enhanced viewing experience are ranked, based on movement threshold scores, in a database accessible by the computing device.

14. The method of claim 1, wherein determining the value indicating the level of movement made by the user during the at least one prior enhanced viewing experience comprises:
    determining a first movement value associated with a first input device; and
    determining a second movement value associated with a second input device.

15. The method of claim 1, wherein determining the value indicating the level of movement made by the user during the at least one prior enhanced viewing experience comprises:
    determining a plurality of movements during the at least one prior enhanced viewing experience; and
    determining a magnitude or degree of each of the plurality of movements.

16. The method of claim 1, wherein the causing output of the first enhanced viewing experience is further based on one or more input capabilities of the computing device.

17. The method of claim 1, wherein the first physical activity level is determined using machine learning.

18. The method of claim 1, further comprising:
determining, by the computing device, a device boundary using machine learning, wherein the determining the first enhanced viewing experience is further based on the device boundary.

19. A method comprising:
causing, by a computing device and based on a determination that a first association between a historical physical activity level and a first physical activity level associated with a first enhanced viewing experience satisfies a first selection threshold, output of the first enhanced viewing experience, wherein the historical physical level comprises a magnitude or degree of movement made by a user during one or more prior enhanced viewing experiences and the first physical activity level is determined by aggregating a plurality of first user movements associated with the first enhanced viewing experience; and
causing, by the computing device and based on a determination that a second association between a current physical activity level and a second physical activity level associated with a second enhanced viewing experience satisfies a second selection threshold, output of the second enhanced viewing experience, wherein the second physical activity level is determined by aggregating a plurality of second user movements associated with the second enhanced viewing experience.

20. The method of claim 19, wherein:
the historical physical activity level is associated with an amount of movement prompted by the first enhanced viewing experience, and
the current physical activity level is associated with an amount of movement prompted by the second enhanced viewing experience.

21. The method of claim 19, further comprising:
selecting, based on the first association, the first enhanced viewing experience; and
selecting, based on an association between the current physical activity level and an amount of movement prompted by the second enhanced viewing experience during the first enhanced viewing experience, the second enhanced viewing experience.

22. A first computing device comprising:
one or more processors; and
memory storing instructions that, when executed by the one or more processors, cause the first computing device to:
determine a historical physical activity level of a user, wherein the historical physical activity level of the user comprises a value indicating a level of movement made by the user during at least one prior enhanced viewing experience;
determine a physical activity level associated with a first enhanced viewing experience by aggregating a plurality of user movements associated with the first enhanced viewing experience;
determine an association between the historical physical activity level and the physical activity level associated with a first enhanced viewing experience;
select the first enhanced viewing experience based on the association exceeding a selection threshold; and
transmit, to a second computing device, the first enhanced viewing experience.

23. The first computing device of claim 22, wherein the instructions, when executed by the one or more processors, cause the first computing device to:
determine a device boundary and a device location; and
select the first enhanced viewing experience by selecting, further based on the device boundary and the device location, the first enhanced viewing experience.

24. The first computing device of claim 22, wherein the instructions, when executed by the one or more processors, cause the first computing device to:
receive an input comprising room dimensions and a configuration of a room; and
determine, based on the room dimensions, the configuration of the room, and determined movement data, a device boundary.

* * * * *

UNITED STATES PATENT AND TRADEMARK OFFICE
CERTIFICATE OF CORRECTION

| | |
|---|---|
| PATENT NO. | : 11,019,389 B2 |
| APPLICATION NO. | : 15/830371 |
| DATED | : May 25, 2021 |
| INVENTOR(S) | : Michael Chen |

It is certified that error appears in the above-identified patent and that said Letters Patent is hereby corrected as shown below:

In the Specification

Detailed Description, Column 3, Line 38:
Delete "105-07." and insert --105-107.--

Detailed Description, Column 3, Line 61:
Delete "105-07." and insert --105-107.--

Detailed Description, Column 5, Line 50:
After "software." delete "¶"

Detailed Description, Column 15, Line 53:
After "experience.", delete "¶"

Detailed Description, Column 21, Line 58:
Delete "830" and insert --820--

Signed and Sealed this
Twenty-eighth Day of March, 2023

*Katherine Kelly Vidal*

Katherine Kelly Vidal
*Director of the United States Patent and Trademark Office*